(12) United States Patent
Ninomiya

(10) Patent No.: US 8,400,892 B2
(45) Date of Patent: Mar. 19, 2013

(54) INFORMATION REPRODUCTION DEVICE, REPRODUCTION STARTING METHOD AND REPRODUCTION STARTING PROGRAM

(75) Inventor: Motofumi Ninomiya, Kanagawa (JP)

(73) Assignee: Sony NEC Optiarc Inc., Tokyo (JP)

( * ) Notice: Subject to any disclaimer, the term of this patent is extended or adjusted under 35 U.S.C. 154(b) by 1314 days.

(21) Appl. No.: 12/118,991

(22) Filed: May 12, 2008

(65) Prior Publication Data

US 2008/0310827 A1    Dec. 18, 2008

(30) Foreign Application Priority Data

Jun. 18, 2007    (JP) ................. 2007-160508

(51) Int. Cl.
- *H04N 7/26* (2006.01)
- *G11B 20/20* (2006.01)
- *G11B 7/00* (2006.01)

(52) U.S. Cl. ............. 369/47.33; 369/30.23; 369/47.32; 369/189; 369/267; 369/232; 386/222

(58) Field of Classification Search ............... 369/53.14, 369/189, 267, 232, 30.04, 47.32, 47.33, 30.23; 720/620; 386/222
See application file for complete search history.

(56) References Cited

U.S. PATENT DOCUMENTS

| | | | |
|---|---|---|---|
| 6,906,889 B2 * | 6/2005 | Hamaguchi et al. | 360/78.04 |
| 7,564,207 B2 * | 7/2009 | Fujimura | 318/432 |
| 2003/0235408 A1 * | 12/2003 | Silvester et al. | 386/126 |
| 2007/0153651 A1 * | 7/2007 | Lin et al. | 369/47.32 |
| 2009/0279393 A1 * | 11/2009 | Wehrenberg | 369/30.04 |

FOREIGN PATENT DOCUMENTS

JP    2000-348431    12/2000

* cited by examiner

*Primary Examiner* — Regina N Holder
*Assistant Examiner* — Dionne Pendleton
(74) *Attorney, Agent, or Firm* — Oblon, Spivak, McClelland, Maier & Neustadt, L.L.P.

(57) ABSTRACT

An information reproduction device sets, from among a plurality of estimated rotation speeds previously estimated, a set rotation speed in accordance with request-specification information specifying a piece of data requested by an external device and a specified rotation speed specified by the external device for a disc-shaped storage medium storing data, rotates the storage medium at the set rotation speed, reads out data from the storage medium at a readout speed that is determined by the set rotation speed of the storage medium, stores the data in a data storage section, and supplies, from among the stored data, the piece of data corresponding to the request-specification information to the external device.

11 Claims, 13 Drawing Sheets

INFORMATION REPRODUCTION DEVICE, REPRODUCTION STARTING METHOD AND REPRODUCTION STARTING PROGRAM

CROSS REFERENCES TO RELATED APPLICATIONS

The present invention contains subject matter related to Japanese Patent Application JP2007-160508 filed in the Japanese Patent Office on Jun. 18, 2007, the entire contents of which being incorporated herein by reference.

BACKGROUND OF THE INVENTION

1. Field of the Invention

The present invention relates to an information reproduction device, reproduction starting method and reproduction starting program, and is preferably applied to an optical disc device that reproduces various kinds of information from an optical disc, for example.

2. Description of the Related Art

An optical disc device that is designed to record and reproduce information (like music content, video content and other types of data) from an optical disc is popular.

Some optical disc devices are, for example, installed in electronics devices, such as a laptop computer and a portable Digital Versatile Disc (DVD) player (for example, see Jpn. Pat. Laid-open Publication No. 2000-348431).

Such optical disc devices receive a command from the electronics devices (also referred to as "external devices"), read out information from an optical disc, and supplies the information to the external devices.

SUMMARY OF THE INVENTION

By the way, the speed of rotating an optical disc for a reproduction process is getting faster over the years. It takes time for such an optical disc device to increase the speed of the optical disc to a predetermined rotation speed. This means it takes time to start reading information from the optical disc and supplying the information to the external device.

The present invention has been made in view of the above points and is intended to provide an information reproduction device, reproduction starting method and reproduction starting program that can reduce the time it takes to start supplying information to an external device.

In one aspect of the present invention, an information reproduction device includes: a receiving section that receives request-specification information specifying a piece of data requested by an external device and a specified rotation speed specifying a rotation speed of a disc-shaped storage medium storing data; a disc rotation section that sets, from among a plurality of estimated rotation speeds previously estimated, a set rotation speed based on the specified rotation speed and rotates the storage medium at the set rotation speed; a data reading section that reads out data from the storage medium at a readout speed that is determined by the set rotation speed of the storage medium; a data storage section that stores the data read out from the storage medium and supplies, from among the stored data, the piece of data corresponding to the request-specification information to the external device; and a data amount determination section that makes a determination as to whether the amount of data stored in the data storage section is greater than or equal to a predetermined amount or not, wherein the disc rotation section sets, when starting the rotation of the storage medium from rest, the estimated rotation speed that is smaller than the specified rotation speed as the set rotation speed, and, each time the data amount determination section determines that the amount of data stored in the data storage section is greater than or equal to the predetermined amount, sets the larger estimated rotation speed as the set rotation speed to gradually increase the set rotation speed to the specified rotation speed.

Accordingly, by rotating the storage medium at the smallest estimated rotation speed, the device can immediately start reading data. In addition, when changing the set rotation speed, the device can prevent the data storage section from being empty.

In another aspect of the present invention, a reproduction starting method of an information reproduction device that sets, from among a plurality of estimated rotation speeds previously estimated, a set rotation speed in accordance with request-specification information specifying a piece of data requested by an external device and a specified rotation speed specified by the external device for a disc-shaped storage medium storing data, rotates the storage medium at the set rotation speed, reads out data from the storage medium at a readout speed that is determined by the set rotation speed of the storage medium, stores the data in a data storage section, and supplies, from among the stored data, the piece of data corresponding to the request-specification information to the external device, the reproduction starting method for starting the rotation of the storage medium from rest including: a rotation speed setting step of setting the estimated rotation speed that is smaller than the specified rotation speed as the set rotation speed; a data amount determination step of making a determination as to whether the amount of data stored in the data storage section is greater than or equal to a predetermined amount or not when the set rotation speed is not the specified rotation speed; and a rotation speed changing step of setting, each time it is determined that the amount of data stored in the data storage section is greater than or equal to the predetermined amount, the larger estimated rotation speed as the set rotation speed to gradually increase the set rotation speed to the specified rotation speed.

Accordingly, by rotating the storage medium at the smallest estimated rotation speed, the device can immediately start reading data. In addition, when changing the set rotation speed, the device can prevent the data storage section from being empty.

In another aspect of the present invention, a reproduction starting program for an information reproduction device that sets, from among a plurality of estimated rotation speeds previously estimated, a set rotation speed in accordance with request-specification information specifying a piece of data requested by an external device and a specified rotation speed specified by the external device for a disc-shaped storage medium storing data, rotates the storage medium at the set rotation speed, reads out data from the storage medium at a readout speed that is determined by the set rotation speed of the storage medium, stores the data in a data storage section, and supplies, from among the stored data, the piece of data corresponding to the request-specification information to the external device, the reproduction starting program causing the information reproduction device when starting the rotation of the storage medium from rest to execute: a rotation speed setting step of setting the estimated rotation speed that is smaller than the specified rotation speed as the set rotation speed; a data amount determination step of making a determination as to whether the amount of data stored in the data storage section is greater than or equal to a predetermined amount or not when the set rotation speed is not the specified rotation speed; and a rotation speed changing step of setting, each time it is determined that the amount of data stored in the data storage section is greater than or equal to the predetermined amount, the larger estimated rotation speed as the set rotation speed to gradually increase the set rotation speed to the specified rotation speed.

Accordingly, by rotating the storage medium at the smallest estimated rotation speed, the device can immediately start reading data. In addition, when changing the set rotation speed, the device can prevent the data storage section from being empty.

According to an embodiment of the present invention, by rotating the storage medium at the smallest estimated rotation speed, the device can immediately start reading data. In addition, when changing the set rotation speed, the device can prevent the data storage section from being empty. Thus, the information reproduction device, the reproduction starting method and the reproduction starting program can reduce the time it takes to start supplying information to an external device.

The nature, principle and utility of the invention will become more apparent from the following detailed description when read in conjunction with the accompanying drawings in which like parts are designated by like reference numerals or characters.

DETAILED DESCRIPTION OF PREFERRED EMBODIMENTS

An embodiment of the present invention will be described in detail with reference to the accompanying drawings.

(1) Overall Configuration

Figure 1:
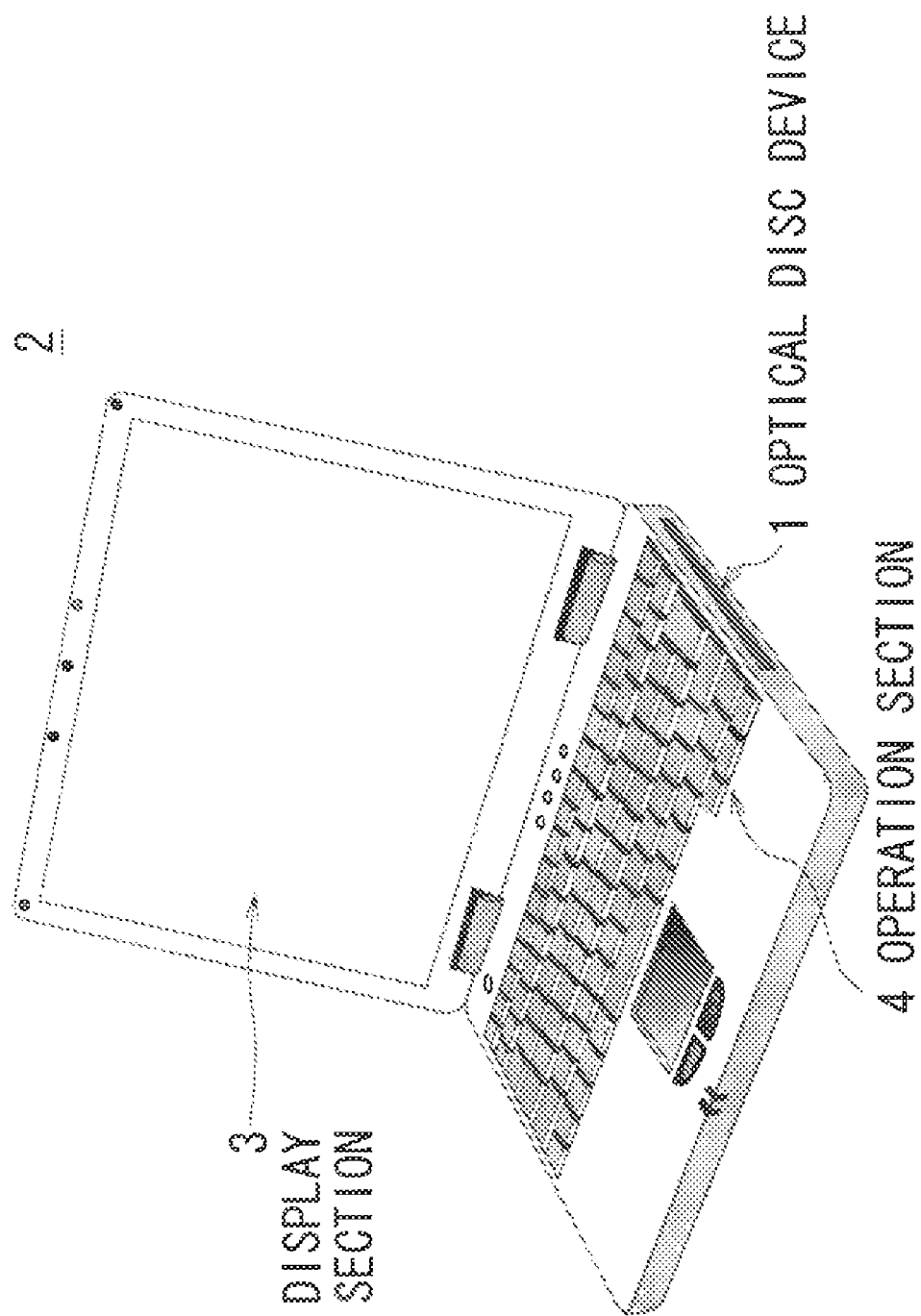
FIG. 1 is an appearance diagram schematically illustrating a main electronics device.

As shown in FIG. 1, an electronics device (referred to as "main electronics device" hereinafter) 2, such as a laptop computer having an optical disc device 1, is powered by a battery (not shown). The main electronics device 2 records and reproduces information, such as music content, video content and other types of data, from an optical disc 100 put in the optical disc device 1. The optical disc 100 includes Blu-ray Disc (Registered Trademark)-Rewritable (BD-RE), BD-Read Only Memory (BD-ROM) and the like.

When a user operates an operation section 4, the main electronics device 2 enters one of the following modes according to the user's operation: stop mode, in which the operation of the optical disc device 1 stops; reproduction mode, in which the optical disc device 1 reads out information from the optical disc 100; and recording mode, in which the optical disc device 1 records information on the optical disc 100.

When a user inputs a reproduction command, the main electronics device 2 starts running in reproduction mode and then orders the optical disc device 1 to read out information from the optical disc 100 and to supply the information to the main electronics device 2. In response, the optical disc device 1 reads out information from the optical disc 100 and supplies the information to the main electronics device 2. The main electronics device 2 displays the information supplied from the optical disc device 1 on a display section 3, or outputs it from a speaker (not shown). In this manner, the main electronics device 2 reproduces information from the optical disc 100.

When a user inputs a recording command, the main electronics device 2 starts running in recording mode, supplies a recording signal, which represents information to be recorded, to the optical disc device 1 and then orders the optical disc device 1 to record the recording signal on the optical disc 100.

When a user inputs a stop command, the main electronics device 2 enters stop mode and stops the operation of the optical disc device 1.

In that manner, the main electronics device 2 controls the optical disc device 1 to record and reproduce information from the optical disc 100.

Figure 2:
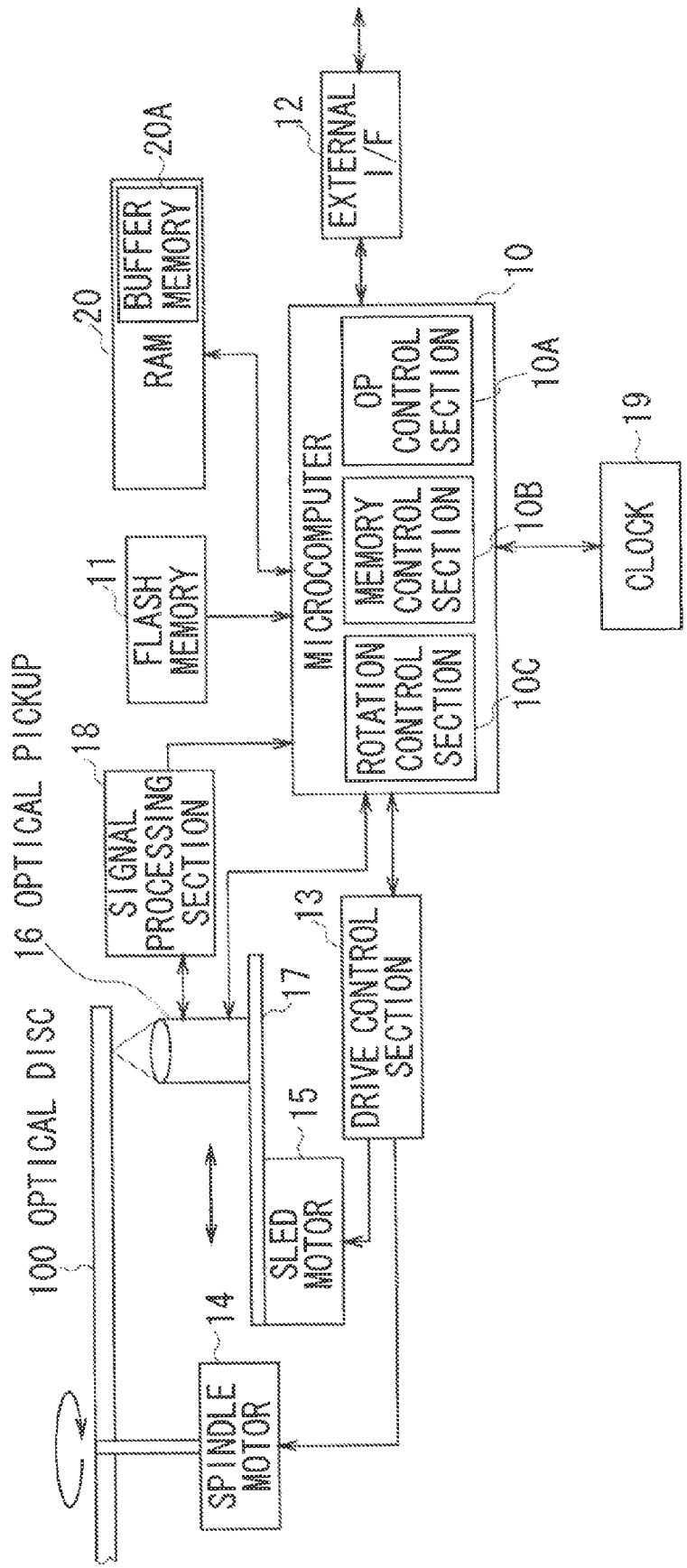
FIG. 2 is a block diagram illustrating the overall configuration of an optical disc device.

As shown in FIG. 2, the optical disc device 1 includes a microcomputer 10 that takes overall control of the optical disc device 1. The optical disc device 1 is powered by the battery of the main electronics device 2 (not shown). The optical disc device 1 reads a rotation control program and other programs from a flash memory 11 and loads them onto a Random Access Memory (RAM) 20, and thereby performs a readout process of reading information from the optical disc 100, a recording process of recording information on the optical disc 100, a rotation control process and data supplying process (described below), and other processes.

More specifically, when a user operates the operation section 4 to input a command for reproducing information from the optical disc 100, the main electronics device 2 (FIG. 1) starts running in reproduction mode and then supplies to the optical disc device 1 via an external interface 12 (FIG. 2) an information-supplying command, which orders the optical disc device 1 to supply information read out from the optical disc 100 to the main electronics device 2. In addition, the main electronics device 2 supplies to the optical disc device 1 specified rotation speed Sd, which specifies the rotation speed of the optical disc 100, and request-specification information, which specifies a piece of information.

With the optical disc 100 put in the optical disc device 1, if the microcomputer 10 receives the information-supplying command, the specified rotation speed Sd and the request-specification information, the microcomputer 10 temporarily stores the specified rotation speed Sd in the RAM 20 and starts a readout process. In the readout process, the microcomputer 10 generates readout-address information from the request-specification information (described below): The readout-address information identifies a piece of information the optical disc device 1 will read out from the optical disc 100. The microcomputer 10 then transmits the readout-address information to a drive control section 13 along with an information-readout command.

Out of the estimated rotation speeds Si of the optical disc 100, the drive control section 13 selects one Si based on the specified rotation speed Sd supplied from the microcomputer 10, and sets it as a set rotation speed Ss (described below).

In response to the information-readout command, the drive control section 13 controls a spindle motor 14 to rotate the optical disc 100 at the set rotation speed Ss by referring to the clock 19. The drive control section 13 also controls, in accordance with the information-readout command and the readout-address information, a sled motor 15 to move an optical pickup 16 in the radial direction of the optical disc 100. In this manner, the drive control section 13 leads an optical beam emitted from a laser diode (not shown) of the optical pickup 16 to a track on a signal recording layer of the optical disc 100: This track corresponds to the readout-address information.

The optical pickup 16 then detects the reflection of the optical beam from the optical disc 100, generates a detection signal proportional to the amount of light it has detected, and supplies the detection signal to a signal processing section 18.

The signal processing section 18 produces from the detection signal a tracking error signal STE and a focus error signal SFE. The tracking error signal STE is proportional to the distance from a point where the optical beam strikes the optical disc 100 to a target track on the optical disc 100, while the focus error signal SFE varies depending on how well the optical beam is focused on the signal recording layer of the optical disc 100. The signal processing section 18 supplies the tracking error signal STE and the focus error signal SFE to the drive control section 13. The signal processing section 18 also generates a reproduction RF signal SRF from the detection signal, and supplies the reproduction RF signal SRF to the microcomputer 10.

The drive control section 13 generates a tracking control signal CT and a focus control signal CF from the tracking error signal STE and the focus error signal SFE, and supplies the tracking control signal CT and the focus control signal CF to the optical pickup 16. In response, the optical pickup 16 performs a tracking control process and a focus control process such that the optical beam is focused on the target track on the optical disc 100.

The microcomputer 10 performs predetermined demodulation and decoding processes and other processes to the reproduction RF signal SRF, and temporarily stores resultant data in a buffer memory 20A as readout data. The buffer memory 20A occupies a predetermined storage area of the RAM 20 (described below). The microcomputer 10 then transmits the readout data to the main electronics device 2 (FIG. 1) as a piece of information specified by the request-specification information: This piece of information is also referred to as a piece of "request data."

More specifically, a memory control section 10B of the microcomputer 10 temporarily stores in the RAM 20 a piece of data address information, which represents an address of the read out data stored in the buffer memory 20A, and a piece of storage area information, which indicates the buffer memory 20's storage area where the readout data are stored, such that they are associated with one another. The memory control section 10B identifies a piece of data address information corresponding to the request-specification information, reads out readout data from the piece of storage area information corresponding to the piece of data address information, and transmits the readout data (or request data), specified by the request-specification information, to the main electronics device 2.

As a result, the main electronics device 2 displays on the display section 3 an image of the request data, or outputs from a speaker (not shown), sound of the request data.

When a user inputs to the main electronics device 2 in stop mode a command for recording information on the optical disc 100, the main electronics device 2 starts running in recording mode. The main electronics device 2 then transmits via the external interface 12 to the optical disc device 1 a recording command, which orders the optical disc device 1 to record information on the optical disc 100, specified rotation speed Sd, which specifies the rotation speed of the optical disc 100, and a recording signal, which represents a piece of information.

After the microcomputer 10 receives from the main electronics device 2 via the external interface 12 the recording command, the specified rotation speed Sd and the recording signal, the optical disc device 1 (FIG. 2) starts a recording process. In the recording process, the optical disc device 1 rotates the optical disc 100 at the speed of the specified rotation speed Sd, performs a predetermined modulation process to the recording signal, converts the recording signal into a recording signal suitable for recording by using the signal processing section 18, emits from the optical pickup 16 a recording beam, which corresponds to the recording signal, toward the optical disc 100. In this manner, the information corresponding to the recording signal is recorded on the optical disc 100.

When the main electronics device 2 enters stop mode in response to the operation by a user and supplies a stop command to the optical disc device 1 via the external interface 12, the optical disc device 1 stops the readout or recording process.

In that manner, the optical disc device 1 performs, in accordance with the information-supplying command and the recording command supplied from the main electronics device 2, the readout process of reading out readout data from the optical disc 100 and the recording process of recording information on the optical disc 100 by rotating the optical disc 100 at the speed of the specified rotation speed Sd supplied from the main electronics device 2.

(2) Advance Reading Function in Reproduction Mode

If something wrong happens to the optical disc device 1 and the reading of consecutive data, like streaming video, from the optical disc 100 stops for a while, the main electronics device 2 may be forced to stop playing back video and audio. To prevent this, the optical disc device 1 has an advance reading function by which the optical disc device 1 read and store data in the buffer memory 20A in advance.

More specifically, the microcomputer 10 of the optical disc device 1 performs a readout process: Instead of reading each piece of data from the optical disc 100 each time it is requested by the main electronics device 2, the microcomputer 10 reads out information from the optical disc 100 in line with the rotation speed of the optical disc 100, and temporarily stores in the buffer memory 20A the information (also called as "readout data").

The microcomputer 10 performs a data supplying process in parallel with the readout process. In the data supplying process, the microcomputer 10 reads out a piece of data requested by the main electronics device 2 from the buffer memory 20A and supplies it to the main electronics device 2 as a piece of request data.

Figure 3:
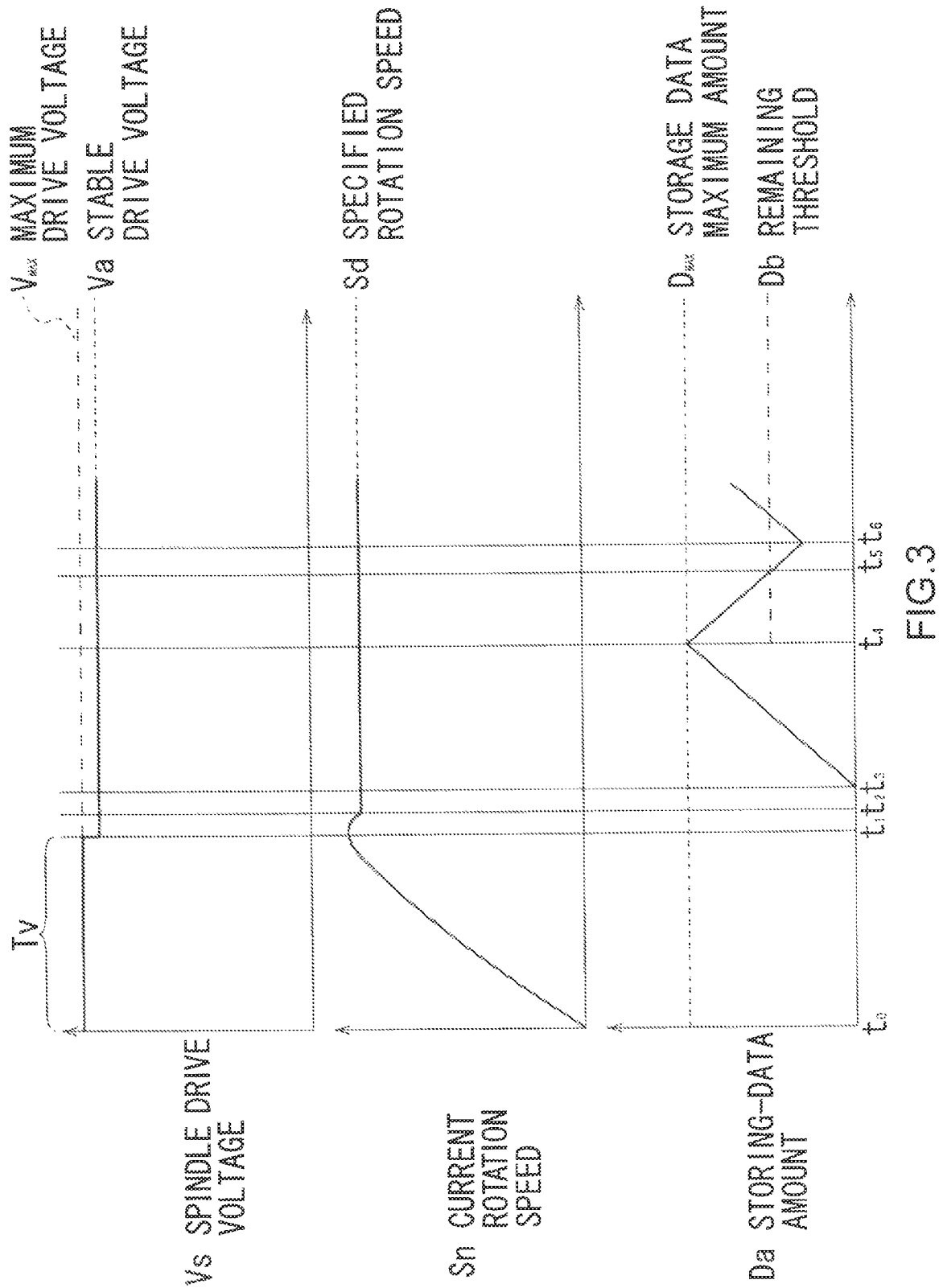
FIG. 3 is a timing diagram illustrating how to start reproduction.

More specifically, as shown in FIG. 3, the microcomputer 10 regards the specified rotation speed Sd as the set rotation speed Ss and starts the readout process at time t0 when it receives a information-supplying command from the main electronics device 2. During the time interval (referred to as "maximum voltage drive time," which is between time t0 and t1 in this case) Tv which is determined by the set rotation speed Ss, the drive control section 13 applies a voltage Vs (such a voltage applied to the spindle motor 14 is also called as a "spindle drive voltage") to the spindle motor 14 (the voltage Vs is a maximum drive voltage $V_{MAX}$ at this time), and then applies a stable drive voltage Va according to the set rotation speed Ss at time t1.

An optical pickup control section (also referred to as "OP control section") 10A of the microcomputer 10 generates a piece of readout address information representing the address of a piece of information specified by the request-specification information, and also monitors the current rotation speed Sn of the optical disc 100 (which is also referred to as "current rotation speed").

When the OP control section 10A recognizes that the current rotation speed Sn is around the set rotation speed Ss and determines that the current rotation speed Sn is stabilized around the set rotation speed Ss at time t1, the OP control section 10A controls the optical pickup 16 and starts emitting an optical beam to the optical disc 100, which is rotating at the speed of the set rotation speed Ss, by referring to the address of the readout-address information.

Incidentally, the information is recorded on the optical disc 100 at a predetermined recording density. Accordingly, the reading speed of the optical disc device 1, a speed at which the optical disc device 1 reads out data from the optical disc 100, depends on the current rotation speed Sn.

The memory control section 10B of the microcomputer 10 temporarily stores the readout data in the buffer memory 20A at time t2: The readout data was read out from the optical disc 100 at a reading speed determined by the current rotation speed Sn as a result of emitting the optical beam to a target track and sequentially supplied via the signal processing section 18. At the same time, the memory control section 10B temporarily stores in the RAM 20 a piece of data address information, which represents the address of the readout data, and a piece of storage area information, which represents the storage area of the buffer memory 20 where the readout data are stored.

When receiving the readout data, the memory control section 10B starts a data supplying process while keep performing the readout process: The memory control section 10B refers to the piece of data address information and piece of storage area information stored in the RAM 20 and reads out a piece of data specified by the request-specification information supplied from the main electronics device 2 from the buffer memory 20A as a piece of request data, and supplies it to the main electronics device 2 via the external interface 12.

In that manner, regardless of whether it has received the request-specification information and its supplying speed, the microcomputer 10 reads out data from the optical disc 100 at the speed of the set rotation speed Ss and temporarily stores them in the buffer memory 20A. If the readout speed of data from the optical disc 100 is faster than the supplying speed, a speed at which the microcomputer 10 supplies the request data to the main electronics device 2, the readout data gradually accumulates in the buffer memory 20A and the amount of data stored in the buffer memory 20A (also referred to as "storing-data amount Da") increases between time t3 and time t4.

When all the storage areas of the buffer memory 20A are occupied by the readout data at time t4 and the amount of data stored in the buffer memory 20A reaches a storage data maximum amount $D_{MAX}$ without any available storage area, the microcomputer 10 controls the OP control section 10A to control the laser diode (not shown) of the optical pickup 16 and stops emitting the optical beam. It stops the reading of data from the optical disc 100 while the optical disc 100 is still rotating at the speed of the set rotation speed Ss.

In this manner, the microcomputer 10 saves power by stopping emitting the optical beam. On the other hand, the microcomputer 10 can immediately restart the reading of data from the optical disc 100 because the optical disc 100 continues rotating.

At this time, the storing-data amount Da of the buffer memory 20A decreases because, while the memory control section 10B stops recording the readout data in the buffer memory 20A due to the stop of the supply of readout data from the signal processing section 18, the memory control section 10B continues reading out request data from the buffer memory 20A and supplying them to the main electronics device 2 in accordance with the request-specification information.

When the storage data amount of the buffer memory 20A, an amount of data stored in the buffer memory 20A, becomes less than a predetermined threshold (also referred to as "remaining threshold Db") at time t5, the OP control section 10A of the microcomputer 10 reads out the piece of data address information of the last readout data from the RAM 20, generates a piece of readout-address information representing a next address following the address represented by the piece of data address information, and supplies it to the drive control section 13.

The drive control section 13, in accordance with the piece of readout-address information, restarts the emitting of the optical beam from the optical pickup 16 to the optical disc 100: The optical beam is emitted toward a track of the next address as opposed to the previous address where data had last been read out.

As a result, the memory control section 10B restarts reading out data from the optical disc 100 at time t6, supplies the readout data via the signal processing section 18, and temporarily stores them in the buffer memory 20A.

In this manner, the microcomputer 10 of the optical disc 1 performs the readout process and the data supplying process in parallel. In the readout process, the microcomputer 10 previously reads out from the optical disc 100 the pieces of information before they are requested by the request-specification information and accumulates them in the buffer memory 20A as readout data. In the data supplying process, the microcomputer 10 reads out from the buffer memory 20A a piece of data requested by the request-specification information supplied from the main electronics device 2, and supplies it to the main electronics device 2. In this manner, the microcomputer 10 reads out from the optical disc 100 a piece of request data specified by the request-specification information and sequentially supplies it to the main electronics device 2.

(3) Reproduction Restart Process

When it starts rotating the optical disc 100 from rest, the drive control section 13 of the optical disc device 1 increases the current rotation speed Sn to the set rotation speed Ss in as short time as possible. Accordingly, the maximum drive voltage $V_{MAX}$ is always applied to the spindle motor 14 regardless of whatever the set rotation speed Ss is.

Figure 4:
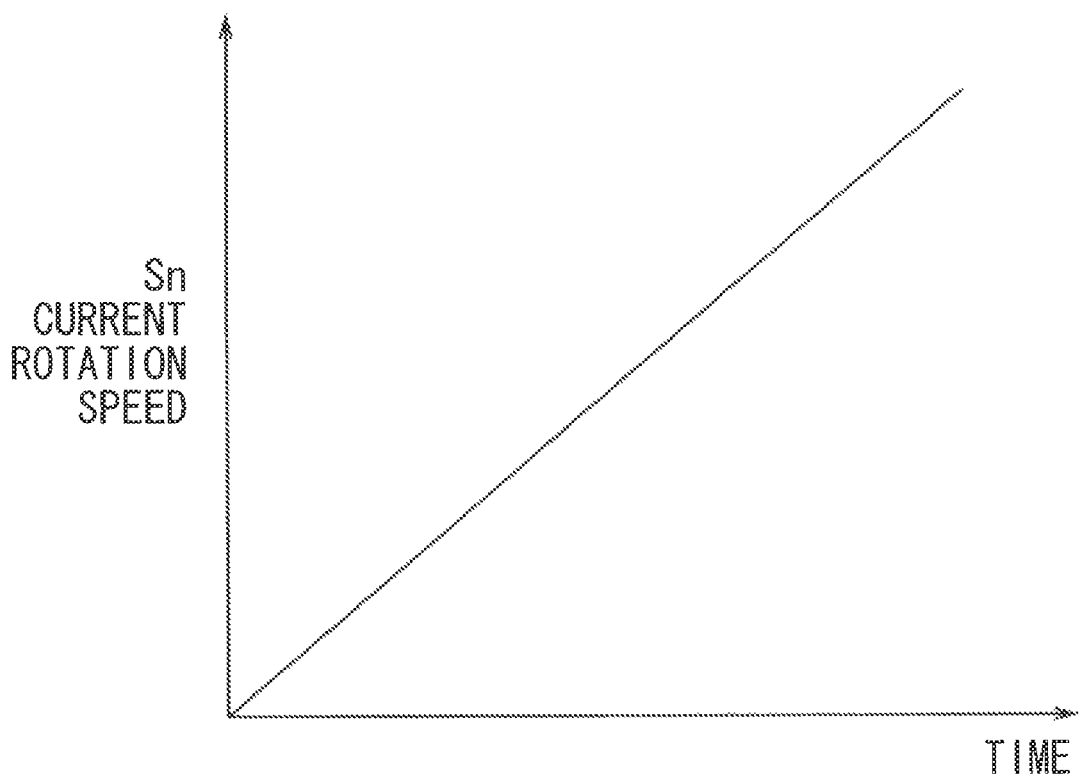
FIG. 4 is a schematic diagram illustrating the relationship between an applying time of a drive voltage and a current rotation speed.

For example, as shown in FIG. 4, in which case the maximum drive voltage $V_{MAX}$ is applied, the time it takes to bring the current rotation speed Sn to the set rotation speed Ss is substantially proportional to the set rotation speed Ss set in the device: The larger the set rotation speed Ss, the more time it takes. It means that, the time interval (also referred to as "maximum voltage applying time") Tv during which it keeps applying one maximum drive voltage $V_{MAX}$ varies according to the set rotation speed Ss.

When the main electronics device 2 in reproduction mode receives a request from a user, the main electronics device 2 temporarily stops reading out data from the optical disc 100 by entering so-called temporarily-stop sub mode. Unless it ends temporarily-stop sub mode during a predetermined reproduction waiting time, the optical disc device 1 stops rotating the optical disc 100 to save power (this situation is also referred to as "rotation stop state").

In temporarily-stop sub mode, it is expected that a user will request the restart of reproducing data from where it temporarily stopped. Accordingly, one may assume that the main electronics device 2 can immediately restart reproducing data because the data it requests may be immediately supplied from the optical disc device 1's buffer memory 20A that temporarily stores them.

However, in a virtual optical disc device 1X (not shown) that is designed to simply read out request data when restarting reproduction and supply them to the main electronics device 2, if the fast specified rotation speed Sd is set as the set rotation speed Ss, it takes time to increase the rotational speed of the optical disc 100 from the rotation stop state to the set rotation speed Ss. This means it also takes time to start reading out data from the optical disc 100 and store them in the buffer memory 20.

As a result, even after the virtual optical disc device 1X has supplied all the pieces of readout data stored in the buffer memory 20A to the main electronics device 2, it has yet to read out data from the optical disc 100. Therefore, the virtual optical disc device 1X may not be able to supply request data to the main electronics device 2 until it restarts reading data from the optical disc 100.

Figure 5:
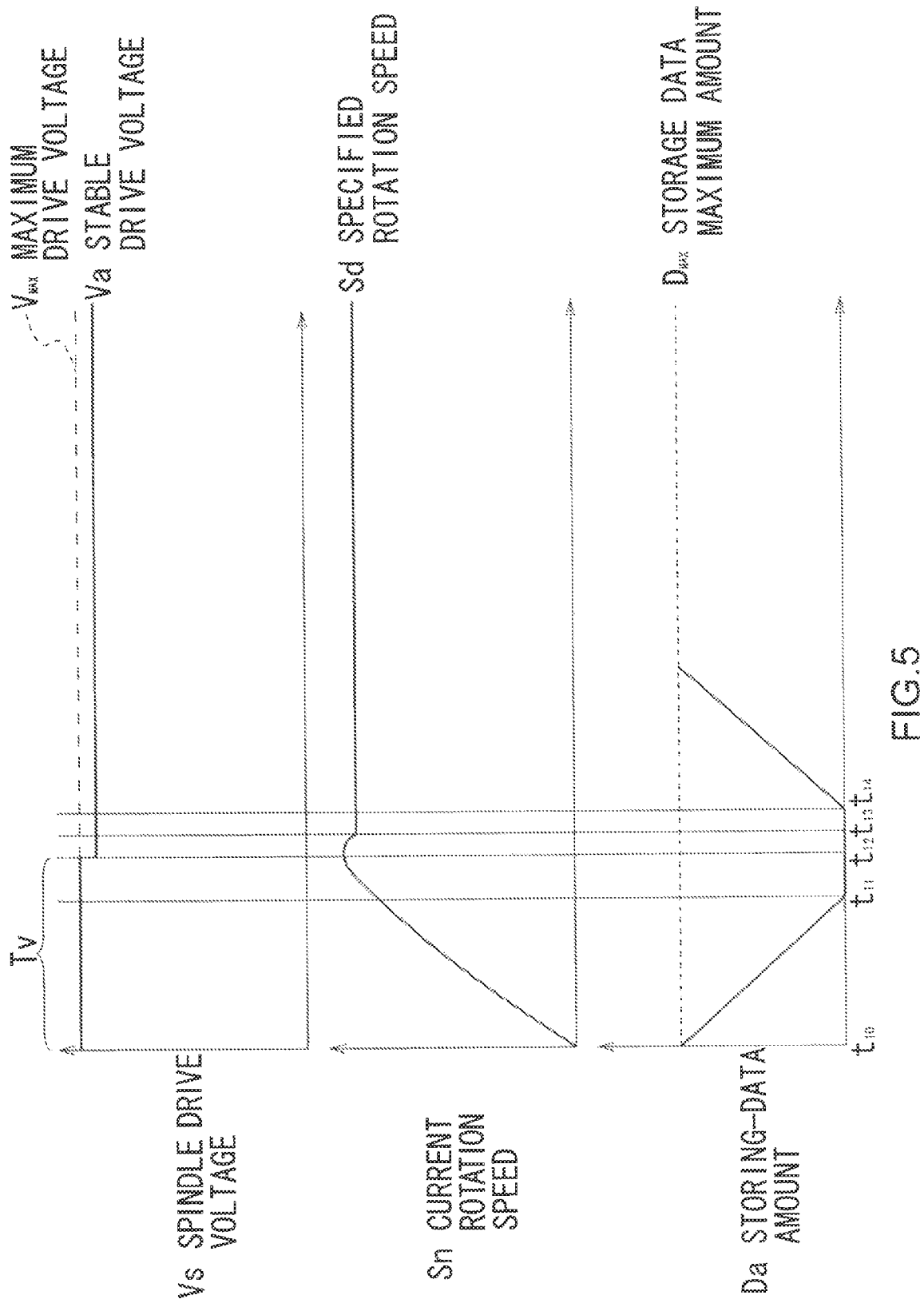
FIG. 5 is a timing diagram illustrating how to restart reproduction with a specified rotation speed set.

Accordingly, as shown in FIG. 5, the above virtual optical disc 1X starts a readout process at time t0 when it receives an information-supplying command from the main electronics device 2, regards the specified rotation speed Sd as the set rotation speed Ss, and applies the maximum drive voltage $V_{MAX}$ to the spindle motor 14 during the maximum voltage applying time Tv determined by the set rotation speed Ss (between time t10 and t12). At the same time t10, the virtual optical disc device 1X starts a data supplying process, reads out a piece of request data specified by the request-specification information from the buffer memory 20A, and supplies it to the main electronics device 2.

Since the maximum voltage applying time Tv is long and the virtual optical disc device 1X emits an optical beam toward the optical disc 100 at time t13 and starts reading out data from the optical disc 100 at time t14, the storing-data amount Da becomes zero at time 11 before the current rotation speed Sn of the optical disc 100 reaches the set rotation speed Ss. As a result, the request data are not being supplied to the main electronics device 2 during the time interval t11 to t14.

As a result, the main electronics device 2 is forced to stop playing video (motion picture) and audio again even though it restarted a while ago, making a user feel discomfort.

On the other hand, when starting a data supplying process to supply readout data to the main electronics device 2, the optical disc device 1 of the present embodiment also starts a gradual reproduction process. In the gradual reproduction process, the optical disc device 1 sets the smallest estimated rotation speed Si as the set rotation speed Ss to immediately start reading information from the optical disc 100, and then gradually increase the rotation speed of the optical disc 100 to the set rotation speed Ss (or the specified rotation speed Sd, which is the same level as that of the previous set rotation speed Ss of the optical disc 100, a speed measured before it temporarily stopped). Accordingly, the optical disc device 1 is able to continue supplying request data to the main electronics device 2 without interruption.

The estimated rotation speeds Si of the optical disc device 1 are Si1, Si2, Si3 and Si4, which for example are one, two, three and four times faster than normal, respectively. The following describes a case in which the specified rotation speed Sd is the fastest one, or the estimated rotation speed Si4.

(3-1) Gradual Reproduction Process

Figure 6:
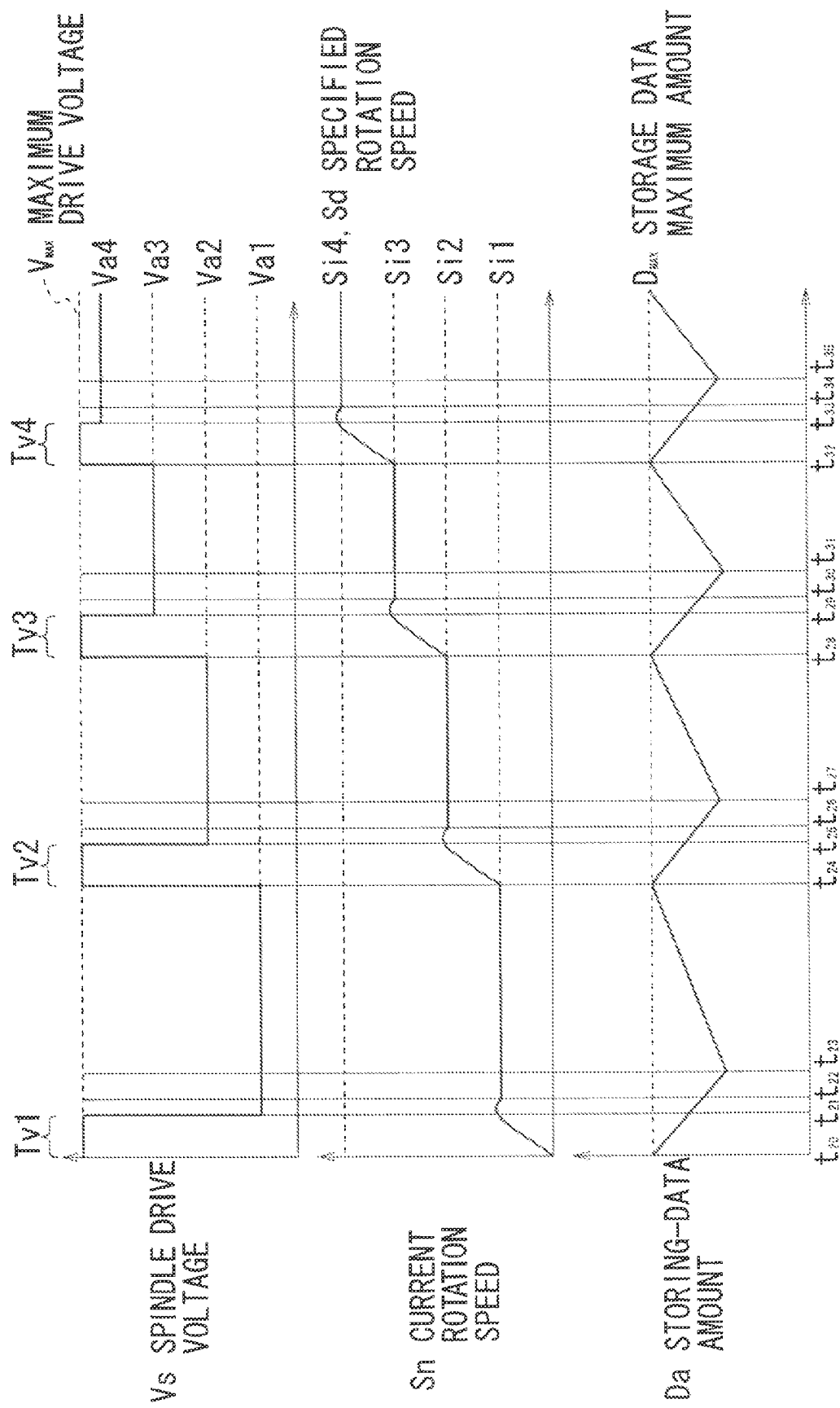
FIG. 6 is a timing diagram illustrating a gradual reproduction process.

As shown in FIG. 6, if the microcomputer 10 of the optical disc device 1 receives the request-specification information from the main electronics device 2 when the optical disc 100 is in the rotation stop state, the microcomputer 10 sets the smallest estimated rotation speed Si1 as the set rotation speed Ss regardless of whatever the specified rotation speed Sd set in the RAM 20 is.

Subsequently, the microcomputer 10 controls the drive control section 13 at time t20 such that the maximum drive voltage $V_{MAX}$ is applied as the spindle drive voltage Vs during the maximum voltage applying time interval Tv from t20 to t21, which is determined by the set rotation speed Ss (or the estimated rotation speed Si1, in this case). The microcomputer 10 then supplies the stable drive voltage Va1 corresponding to the estimated rotation speed Si1 at time t21.

At the same time t20, the microcomputer 10 starts a data supplying process by using the memory control section 10B: The microcomputer 10 reads out from the buffer memory 20A the pieces of request data specified by the pieces of request-specification information continuously supplied from the main electronics device 2, and supplies them to the main electronics device 2. As a result, the storing-data amount Da, an amount of data stored in the buffer memory 20A, gradually decreases from the storage data maximum amount $D_{MAX}$ at time t20.

After the current rotation speed Sn of the optical disc 100 is stabilized around the estimated rotation speed Si1 at time t22, the OP control section 10A of the microcomputer 10 emits an optical beam to the optical disc 100. After starting reading data from the optical disc 100 as a result of emitting the optical beam to a target track, the memory control section 10B of the microcomputer 10 at time t23 temporarily stores in the buffer memory 20A the readout data supplied from the signal processing section 18. As a result, the storing-data amount Da of the buffer memory 20A starts increasing at time t23.

In that manner, by setting the estimated rotation speed Si1 as the set rotation speed Ss in the readout process, the microcomputer 10 shortens the maximum voltage applying time Tv1. It also shortens the time from when the readout process starts until the readout data are actually read out from the optical disc 100 (t20 to t23).

Accordingly, the microcomputer can start reading data from the optical disc 100 before the storing-data amount Da becomes zero during the data supplying process (t23). Therefore, the microcomputer 10 is able to keep supplying request data to the main electronics device 2 without interruption.

Subsequently, the microcomputer 10 monitors the storing-data amount Da of the buffer memory 20A. When the storing-data amount Da becomes the storage data maximum amount $D_{MAX}$ at time t24, the microcomputer 10 sets the second smallest estimated rotation speed Si2 as the set rotation speed Ss. At the same time, the OP control section 10A stops emitting the optical beam to the optical disc 100.

At this time, the optical disc 100 is rotating at the speed of the estimated rotation speed Si1, not in the rotation stop state. Accordingly, the drive control section 13 applies the maximum drive voltage during the maximum voltage applying time interval Tv2 between t24 and t25, which is determined by the difference between the estimated rotation speeds Si1 and Si2. At time t25, the drive control section 13 applies a stable drive voltage Va2 according to the estimated rotation speed Si2.

When the current rotation speed Sn of the optical disc 100 is stabilized around the estimated rotation speed Si2 at time t26, the OP control section 10A of the microcomputer 10 starts emitting an optical beam to the optical disc 100. As a result, the memory control section 10B of the microcomputer 10 temporarily stores in the buffer memory 20A the readout data supplied from the signal processing section 18 at time t27.

In this manner, the microcomputer 10 changes the set rotation speed Ss from the estimated rotation speed Si1 to the estimated rotation speed Si2 when the optical disc is already rotating at the speed of the estimated rotation speed Si1, resulting in the short maximum voltage applying time Tv2. Accordingly, a readout downtime t24 to t27 during which the process of reading data from the optical disc 100 is suspended becomes shorter than the time it would take to increase the rotation speed of the optical disc 100 from rest to the estimated rotation speed Si2.

Moreover, after the storing-data amount Da becomes the storage data maximum amount $D_{MAX}$, the microcomputer 10 changes the set rotation speed Ss from the estimated rotation speed Si1 to the estimated rotation speed Si2. Accordingly, it slows the decrease of the storing-data amount Da of the buffer memory 20A during the data supplying process, and thereby tries to prevent the storing-data amount Da of the buffer memory 20A to be zero during the readout downtime, during which the set rotation speed Ss changes.

And the microcomputer 10 monitors the storing-data amount Da of the buffer memory 20A. When the storing-data amount Da becomes the storage data maximum amount $D_{MAX}$ at time t28, the microcomputer 10 sets the third smallest estimated rotation speed Si3 as the set rotation speed Ss and then, during the time between t29 and 31, performs a similar process to that of the time between t25 and t27 in which the estimated rotation speed Si2 is applied.

Moreover, at time t31, the microcomputer 10 sets the estimated rotation speed Si4 (or the specified rotation speed) as the set rotation speed Ss and then, during the time between t32 and 35, performs a similar process to that of the time between t25 and t27 in which the estimated rotation speed Si2 is applied.

In that manner, the microcomputer 10 gradually increases the set rotation speed Ss to the estimated rotation speed Si4 (or the specified rotation speed Sd). After that, the readout process is carried out with the speed maintained at the specified rotation speed Sd.

In this manner, when restarting reproduction, the optical disc device 1 first sets the smallest (or slowest) estimated rotation speed Si1 as the set rotation speed Ss, and, when the storing-data amount Da becomes the storage data maximum amount $D_{MAX}$, sets the second smallest (or slowest) estimated rotation speed Si2 as the set rotation speed Ss. This allows the optical disc device 1 to supply request data to the main electronics device 2 immediately. Therefore, it can keep supplying the request data to the main electronics device 2 without interruption. And finally, the readout process is carried out with the specified rotation speed Si4.

Thus, such a process of the optical disc device 1 allows the main electronics device 2 to restart playback of video and audio immediately without any interruption, providing smooth playback.

(3-2) High-Speed Reproduction Process

Figure 7:
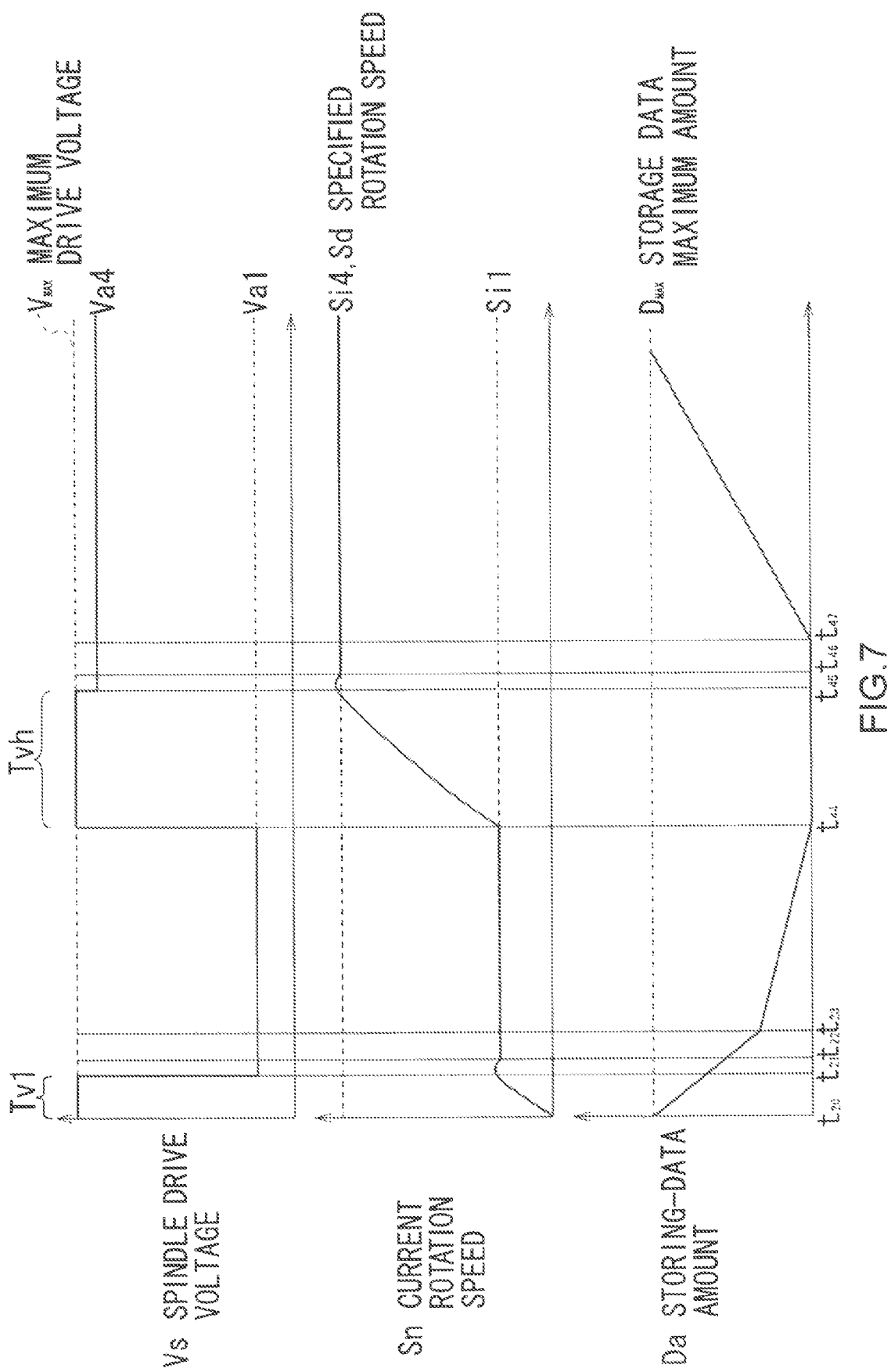
FIG. 7 is a timing diagram illustrating a high-speed reproduction process.

By the way, if the speed at which request data are read out from the buffer memory 20A is faster than the readout speed of the estimated rotation speed Si1, the storing-data amount Da of the buffer memory 20A keeps declining at time t23 when the readout process of data from the optical disc 100 starts to supply them to the buffer memory 20A, as shown in FIG. 7.

In this case, the storing-data amount Da of the buffer memory 20A becomes zero at time t44. Since continuing the gradual reproduction process with the estimated rotation speed Si1 does not fill the buffer memory 20A with the data of the storage data maximum amount $D_{MAX}$, the device may not be able to gradually increase the set rotation speed Ss to the specified rotation speed Sd.

Accordingly, when the storing-data amount Da becomes zero, the optical disc device 1 stops the gradual reproduction process and starts a high-speed reproduction process to set the specified rotation speed Sd (or the estimated rotation speed Si4) as the set rotation speed Ss.

More specifically, when the storing-data amount Da becomes zero at time t44, the microcomputer 10 applies the maximum drive voltage $V_{MAX}$ during a maximum voltage applying time Tvh between t44 and t45, which is determined by the difference between the estimated rotation speeds Si1 and Si4.

When the current rotation speed Sn of the optical disc 100 is stabilized around the estimated rotation speed Si4 at t46, the OP control section 10A of the microcomputer 10 emits an optical beam to the optical disc 100. At time t47, the memory control section 10B of the microcomputer 10 temporarily stores the readout data supplied from the signal processing section 18 in the buffer memory 20A and starts supplying request data to the main electronics device 2 again.

Therefore, the microcomputer 10 can read out data from the optical disc 100 at the speed of the specified rotation speed Sd requested by the main electronics device 2. Accordingly, the speed at which request data are supplied to the main electronics device 2 is always slower than the speed at which data are read out from the optical disc 100. Thus, request data are smoothly supplied to the main electronics device 2.

Incidentally, if a user specifies, when reproduction restarts or during a reproduction process, a different point of data for reproduction, the RAM 20 may not have a piece of data address information representing the request-specification information and the buffer memory 20A may not have a piece of request data specified by the request-specification information. Even in this case, the microcomputer 10 starts the high-speed reproduction process at time t44 in a similar way to the above.

In that manner, when the storing-data amount Da of the buffer memory 20A becomes zero during the gradual reproduction process, the optical disc device 1 sets the specified rotation speed Sd as the set rotation speed Ss and starts the readout process. In this manner, the optical disc device 1 can immediately start the readout process with the specified rotation speed Sd when the speed at which request data are read out from the buffer memory 20A is faster than the readout speed of the estimated rotation speed Si1. Thus, the optical disc device 1 can smoothly restart reproduction from the rotation stop state.

As a result, although it takes a little time to restart reproduction, the optical disc device 1 allows the main electronics device 2 to play video and audio without any interruption after the reproduction restarts.

(3-3) Rotation Stop Process

As described above, when a user inputs a command, the main electronics device 2 switches from reproduction mode to temporarily-stop sub mode. If the main electronics device 2 operates in temporarily-stop sub mode for more than the predetermined reproduction waiting time, the optical disc device 1 determines that a user would not restart reproduction soon, and then performs a rotation stop process to temporarily stop the rotation of the optical disc 100 for power saving. As a result, the optical disc 100 will be in the rotation stop state.

During the rotation stop process, the optical disc device 1 fills the buffer memory 20A with data to the storage data maximum amount $D_{MAX}$ before stopping the rotation of the optical disc 100.

Figure 8:
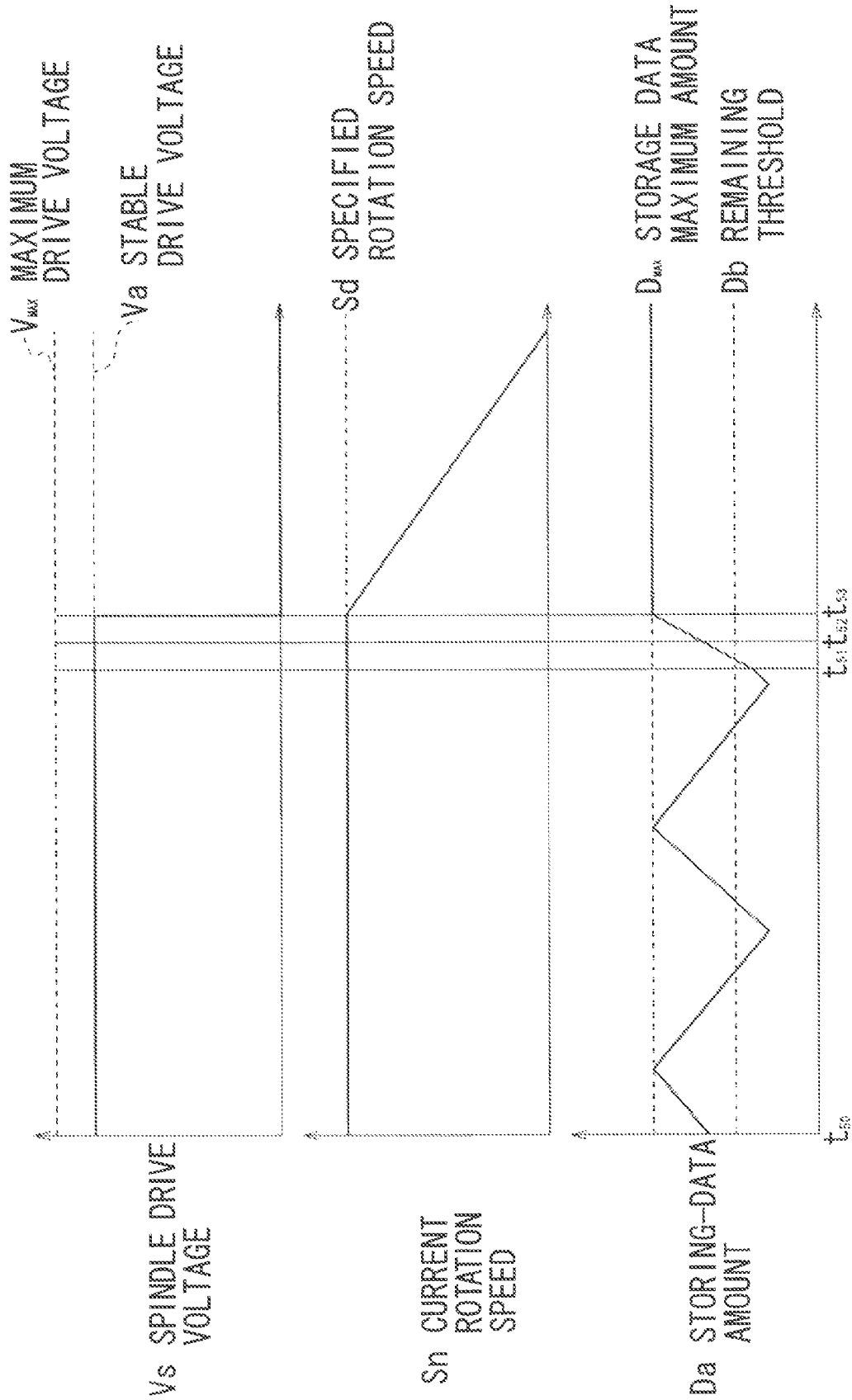
FIG. 8 is a timing diagram illustrating a rotation stop process.
Figure 9:
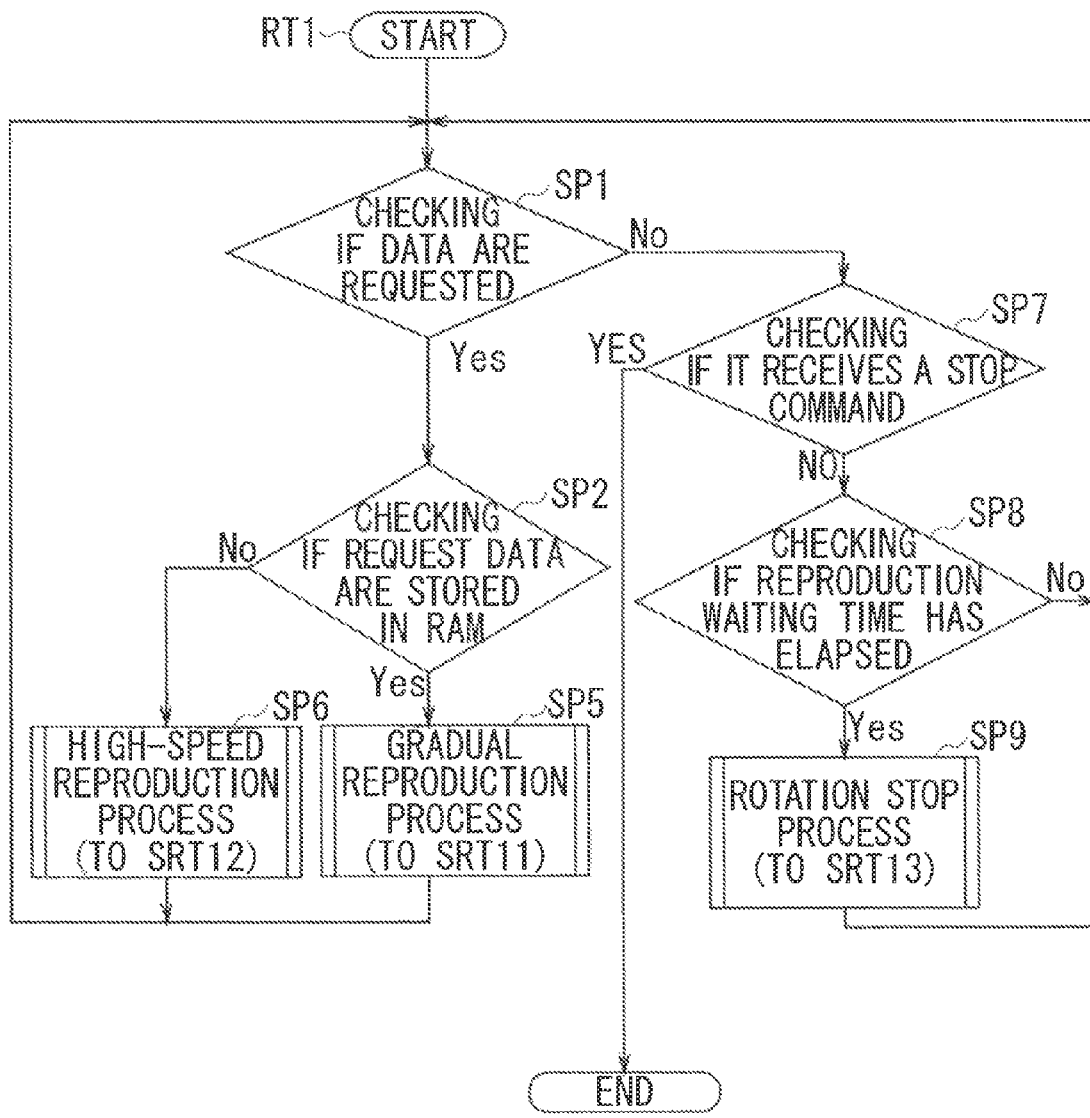
FIG. 9 is a flowchart illustrating a procedure of a rotation control process.
Figure 10:
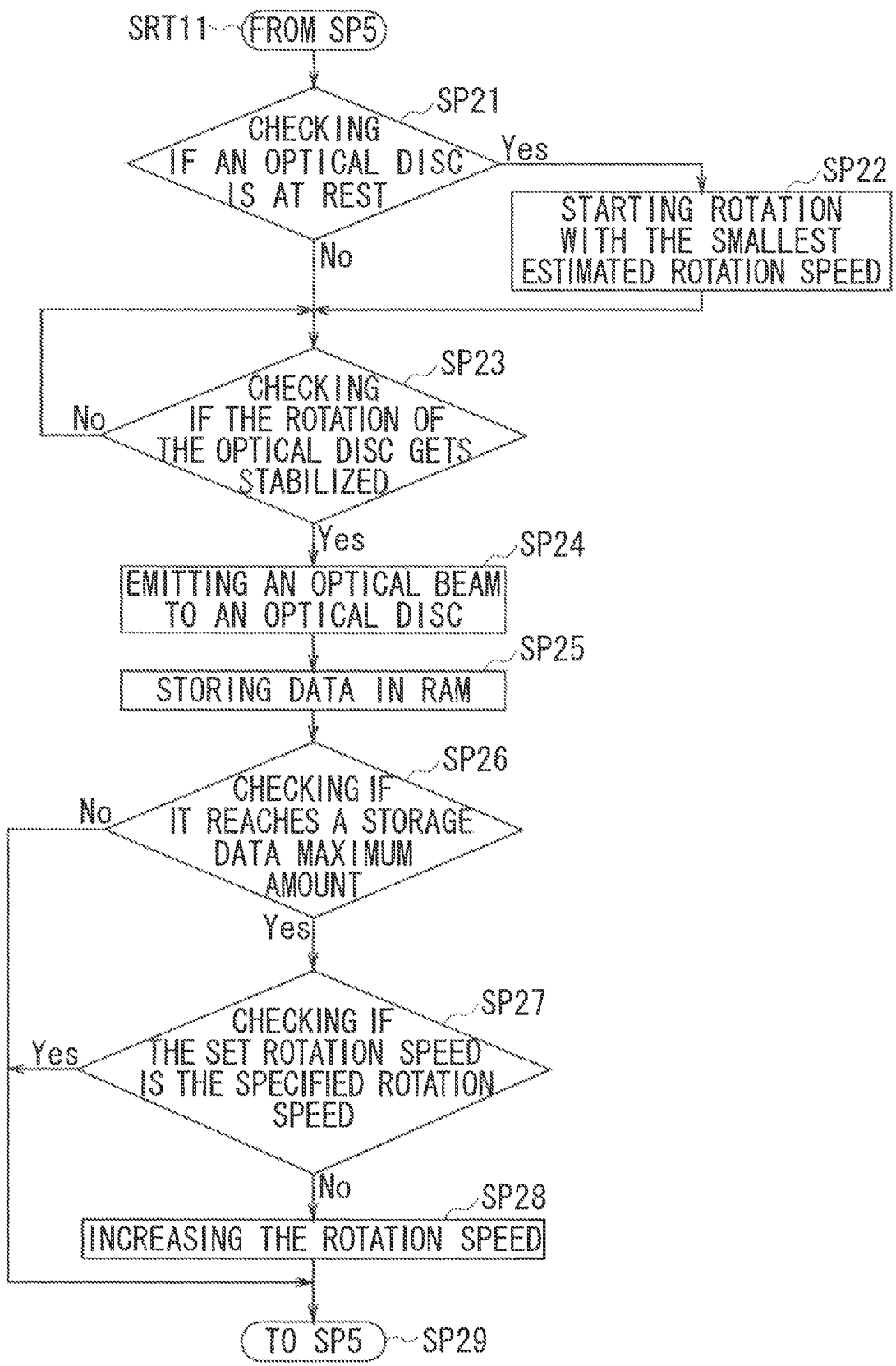
FIG. 10 is a flowchart illustrating a procedure of a gradual reproduction process.

For example, as shown in FIG. 8, the time between t50 and t51 represents the state of the readout and data supplying processes by the microcomputer 10 of the optical disc device 1. That is, the drive control section 13 of the optical disc device 1 applies the stable drive voltage Va as the spindle drive voltage Vs: With the current rotation speed Sn maintained at the specified rotation speed Sd, the optical disc device 1 intermittently emits an optical beam. Consequently, the storing-data amount Da of the buffer memory 20A periodically increases and decreases.

At time t51, the main electronics device 2 enters temporarily-stop sub mode, and therefore the supply of the request-specification information stops. In this case, while continuing the readout process, the microcomputer 10 stops supplying the request data. After the predetermined reproduction waiting time (from t51 to t52) elapses, the OP control section 10A of the microcomputer 10 reads out data from the optical disc 100 until the storing-data amount Da achieves the storage data maximum amount $D_{MAX}$ (between time t52 and t53). After the storing-data amount Da achieves the storage data maximum amount $D_{MAX}$, the drive control section 13 at time t53 sets zero as the spindle drive voltage Vs to stop the rotation of the optical disc 100.

In this manner, before stopping the rotation of the optical disc 100, the optical disc device 1 fills the buffer memory 20 with data to the storage data maximum amount $D_{MAX}$, which will be supplied to the main electronics device 2 immediately after it restarts the reproduction process. This can prevent the storing-data amount Da from becoming zero during the gradual reproduction process after the optical disc device 1 restarts the reproduction process.

(4) Procedures of Rotation Control Process and Data Supplying Process in Reproduction Mode FIGS. 9 to 12 are flowcharts illustrating a procedure RT1 of a rotation control process and a procedure RT2 of a data supplying process, which are performed based on a rotation control program. After the main electronics device 2 enters reproduction mode (including temporarily-stop sub mode) and before it switches to stop mode, the optical disc device 1 performs the procedure RT1 (FIG. 9) and the procedure RT2 (FIG. 13) in parallel.

(4-1) Procedure of Rotation Control Process

When receiving the information-supplying command from the main electronics device 2, the microcomputer 10 of the optical disc 1 starts the procedure RT1 and then proceeds to step SP1.

At step SP1, the microcomputer 10 makes a determination as to whether the request-specification information has been supplied from the main electronics device 2. If the request-specification information has been supplied from the main electronics device 2, the microcomputer 10 proceeds to step SP2.

At step SP2, the microcomputer 10 makes a determination as to whether the buffer memory 20A stores a piece of request data specified by the request-specification information. If the affirmative result is obtained at step SP2, then this means that, since it is performing the readout process or has just restarted reproduction from the rotation stop state, the microcomputer 10 should provide request data to the main electronics device 2 so that a user can view or listen to them immediately. In this case, the microcomputer 10 proceeds to step SP5.

At step SP5, the microcomputer 10 proceeds to a sub routine RT11 (FIG. 10) and starts the gradual reproduction process. The microcomputer 10 then returns to step SP1 and continues the process.

Whereas if the negative result is obtained at step SP2, then this means that, since a user orders the device to start the reproduction process from the beginning or specifies a different point of data for reproduction, the microcomputer 10 should smoothly provide the request data to the main electronics device 2 even if a user has to wait for a while. Alternatively, the negative result at step SP2 may mean that, since the speed at which the request data are supplied is faster than the readout speed of the estimated rotation speed Si1, it is difficult to perform the gradual reproduction process. In this case, the microcomputer 10 proceeds to step SP6.

At step SP6, the microcomputer 10 proceeds to a sub routine SRT12 (FIG. 11) and performs the high-speed reproduction process. The microcomputer 10 then returns to step SP1 and continues the process.

If the negative result is obtained at step SP1, the microcomputer 10 proceeds to step SP7 and makes a determination as to whether the stop command is supplied from the main electronics device 2. If the negative result is obtained at step SP7, the microcomputer 10 proceeds to step SP8.

At step SP8, the microcomputer 10 makes a determination as to whether the reproduction waiting time has elapsed. If the affirmative result is obtained at step SP8, then this means that a user would not restart reproduction soon because the predetermined reproduction waiting time has elapsed since the main electronics device 2 started running in temporarily-stop sub mode in response to user's operation. In this case, the microcomputer 10 proceeds to step SP9.

At step SP9, the microcomputer 10 proceeds to a sub routine SRT13 (FIG. 12) and performs the rotation stop process. The microcomputer 10 then returns to step SP1 and continues the process.

Whereas if the affirmative result is obtained at step SP7, then this means that the main electronics device 2 has switched from reproduction mode to stop mode. In this case, the microcomputer 10 proceeds to end step to end the procedure RT1.

(4-2) Procedure of Gradual Reproduction Process

At step SP5 of the procedure RT1 (FIG. 9), the microcomputer 10 of the optical disc device 1 proceeds to step SP21 of the sub routine SRT11 (FIG. 10) and makes a determination as to whether the optical disc 100 is in the rotation stop state.

If the affirmative result is obtained at step SP21, the microcomputer 10 sets the smallest estimated rotation speed Si1 as the set rotation speed Ss, starts rotating the optical disc 100 (at t20, as shown in FIG. 6), and then proceeds to step SP23.

At step SP23, the microcomputer 10 continues monitoring the current rotation speed Sn of the optical disc 100. When the current rotation speed Sn gets stabilized around the set rotation speed Ss (at time t22, as shown in FIG. 6), the microcomputer 10 proceeds to step SP24.

At step SP24, the microcomputer 10 emits an optical beam to the optical disc 100 (at time t22, as shown in FIG. 6), and then proceeds to step SP25.

At step SP25, the microcomputer 10 stores in the buffer memory 20A the readout data supplied from the optical disc 100 via the signal processing section 18 (at time t23, as shown in FIG. 6), and then proceeds to step SP26.

At step SP26, the microcomputer 10 makes a determination as to whether the storing-data amount Da reaches the storage data maximum amount $D_{MAX}$.

If the affirmative result is obtained at step SP26, then it means that, even if the microcomputer 10 stops reading out data from the optical disc 100 at this time, the buffer memory 20A is filled with readout data enough to be able to continue supplying request data to the main electronics device 2 for the longest time. In this case, the microcomputer 20 proceeds to step SP27.

At step SP27, the microcomputer 10 makes a determination as to whether the currently-set rotation speed Ss is the specified rotation speed Sd. If the affirmative result is obtained at step SP27, the microcomputer 10 sets the next smallest estimated rotation speed Si as the set rotation speed Ss to gradually increase the current rotation speed Sn (at time t24, t28 and t32, as shown in FIG. 6), and then proceeds to step SP29.

Whereas if the negative result is obtained at step SP26, then this means that the microcomputer 10 should not increase the current rotation speed Sn immediately. In this case, the microcomputer 10 proceeds to step SP29.

If the negative result is obtained at step SP27, then this means that the specified rotation speed Sd has been already set as the set rotation speed Ss and thereby the microcomputer 10 does not have to increase the current rotation speed Sn anymore. In this case, the microcomputer 10 proceeds to step SP29.

At step SP29, the microcomputer 10 returns to step SP5 of the procedure RT1 (FIG. 9) and continues the process.

(4-3) Procedure of High-Speed Reproduction Process

Figure 11:
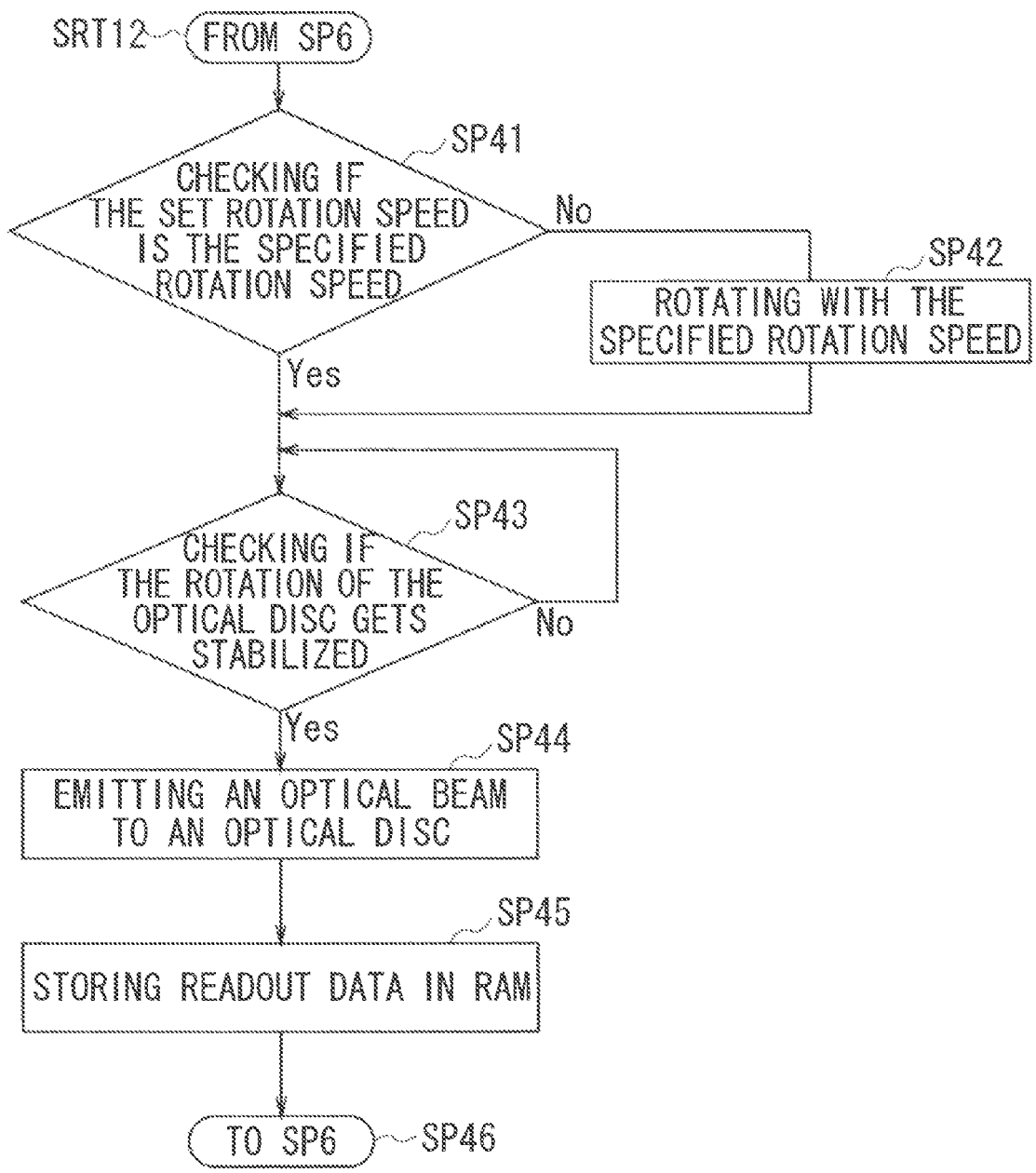
FIG. 11 is a flowchart illustrating a procedure of a high-speed reproduction process.

At step SP6 of the procedure RT1 (FIG. 9), the microcomputer 10 of the optical disc device 1 proceeds to step SP41 of the sub routine SRT12 (FIG. 11).

At step SP41, the microcomputer 10 makes a determination as to whether the set rotation speed Ss is the specified rotation speed Sd. If the affirmative result is obtained at step SP41, the microcomputer 10 proceeds to step SP43.

Whereas if the negative result is obtained at step SP41, the microcomputer 10 proceeds to step SP42, sets the specified rotation speed Sd as the set rotation speed Ss, and then rotates the optical disc 100 at the speed of the specified rotation speed Sd (t44, as shown in FIG. 7).

At step SP43, the microcomputer 10 continues monitoring the current rotation speed Sn of the optical disc 100. When the current rotation speed Sn gets stabilized around the set rotation speed Ss (at time t46, as shown in FIG. 7), the microcomputer 10 proceeds to step SP44.

At step SP44, the microcomputer 10 emits an optical beam to the optical disc 100 (at time t46, as shown in FIG. 7), and then proceeds to step SP45.

At step SP45, the microcomputer 10 stores in the buffer memory 20A the readout data supplied from the optical disc 100 via the signal processing section 18 (at time t47, as shown in FIG. 7), and then proceeds to step SP46.

At step SP46, the microcomputer 10 returns to step SP6 of the procedure RT1 (FIG. 9) and continues the process.

(4-4) Procedure of Rotation Stop Process

Figure 12:
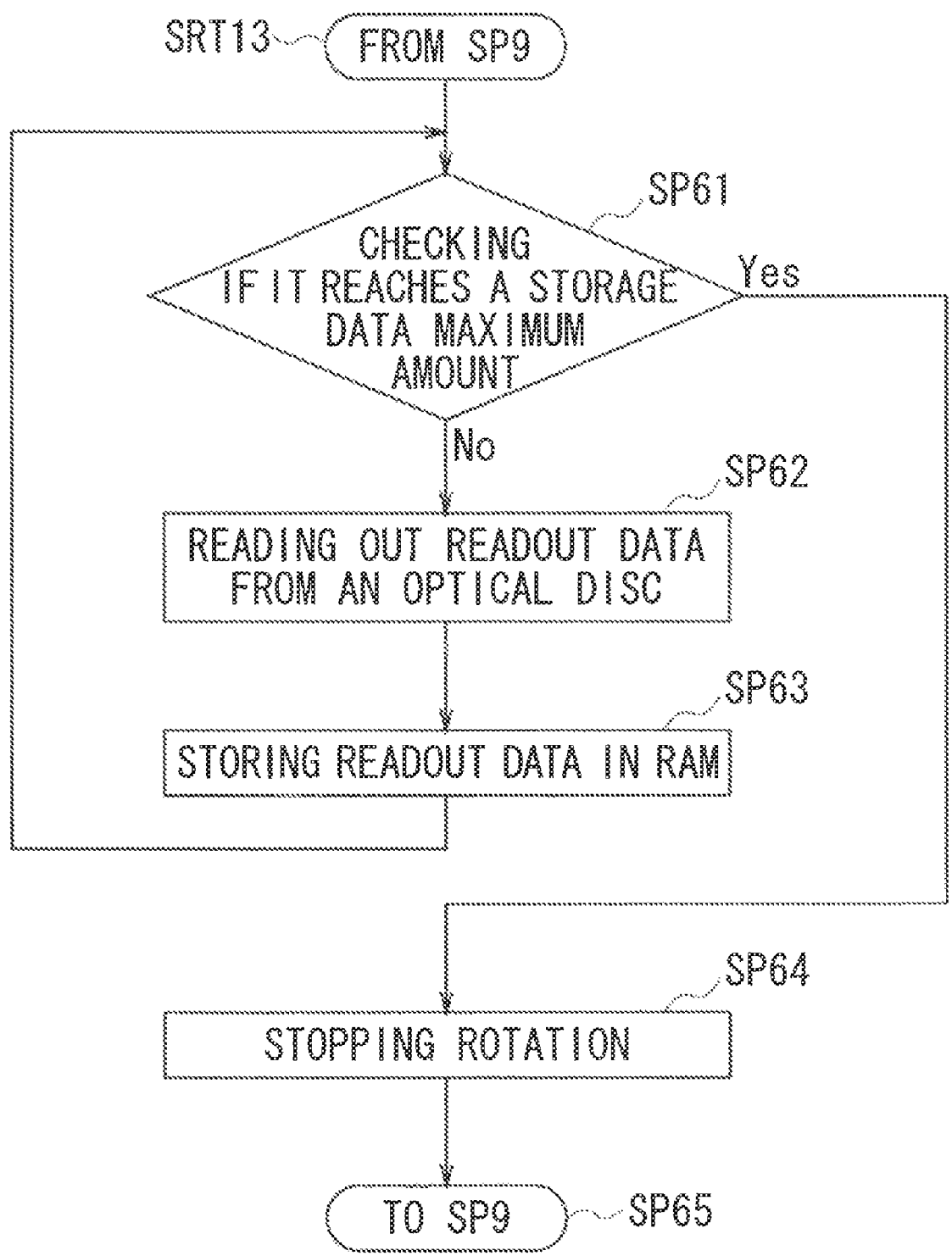
FIG. 12 is a flowchart illustrating a procedure of a rotation stop process.
Figure 13:
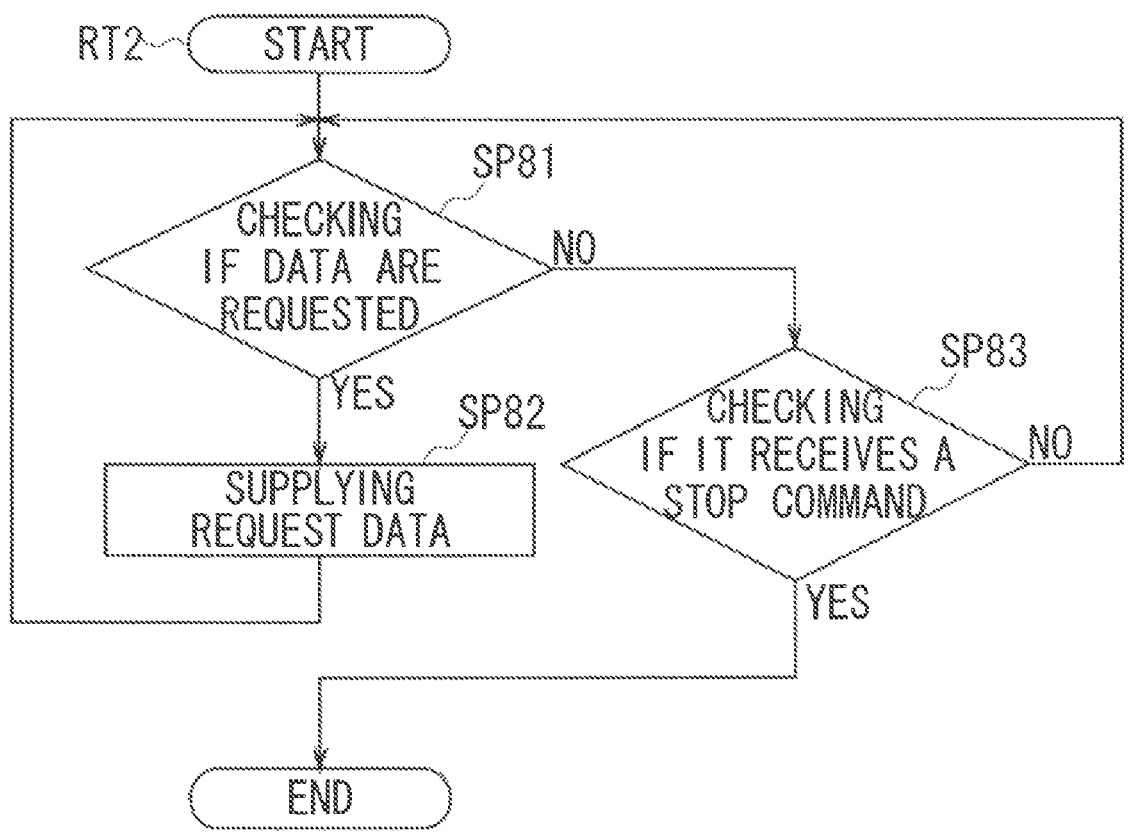
FIG. 13 is a flowchart illustrating a procedure of a data supplying process.

At step SP9 of the procedure RT1 (FIG. 9), the microcomputer 10 of the optical disc device 1 proceeds to step SP61 of the sub routine SRT13 (FIG. 12).

At step SP61, the microcomputer 10 makes a determination as to whether the storing-data amount Da has reached the storage data maximum amount $D_{MAX}$. If the negative result is obtained, the microcomputer 10 proceeds to step SP62.

At step SP62, the microcomputer 10 reads out data from the optical disc 100 (t52 to t53, as shown in FIG. 8), and proceeds to step SP63.

At step SP63, the microcomputer 10 stores data read out from the optical disc 100 in the buffer memory 20A as readout data, and then returns to step SP61 to continue the process.

Whereas if the affirmative result is obtained at step SP61 (t53, as shown in FIG. 8), then this means that the buffer memory 20A is completely filled with readout data. In this case, the microcomputer 10 proceeds to step SP65 after stopping the rotation of the optical disc 100 at step SP64.

At step SP65, the microcomputer 10 returns to step SP9 of the procedure RT1 (FIG. 9) and continues the process.

(4-5) Procedure of Data Supplying Process

After receiving the information-supplying command from the main electronics device 2, the microcomputer 10 of the optical disc device 1 starts the procedure RT2 of a data supplying process and proceeds to step SP81.

At step SP81, the microcomputer 10 makes a determination as to whether the request-specification information has been supplied from the main electronics device 2. If the request-specification information has been supplied from the main electronics device 2, the microcomputer 10 proceeds to step SP82.

At step SP82, the microcomputer 10 reads out a piece of readout data specified by the request-specification information from the buffer memory 20A, supplies it to the main electronics device 2 as request data, and then returns to step SP81 to continue the process.

Whereas if the negative result is obtained at step SP81, the microcomputer 10 proceeds to step SP83 and makes a determination as to whether the stop command has been supplied from the main electronics device 2.

If the negative result is obtained at step SP83, the microcomputer 10 returns to step SP81 and continues the process.

Whereas if the affirmative result is obtained at step SP83, then this means that the main electronics device 2 has entered stop mode. In this case, the microcomputer 10 proceeds to end step to end the procedure RT2.

(5) Operation and Effect

The optical disc device 1 of the above configuration includes the external interface 12 that receives the request-specification information that specifies, as request data, a piece of data requested by the external device (or the main electronics device 2) and the information about the specified rotation speed that specifies the rotational speed of the optical disc 100 (or a disc-shaped storage medium). The optical disc device 1 sets, from among a plurality of estimated rotation speeds Si1 to Si4 which are previously estimated, the set rotation speed Ss based on the specified rotation speed Sd supplied from the main electronics device 2, rotates the optical disc 100 at the speed of the set rotation speed Ss, reads out, as readout data, data from the optical disc 100 at the readout speed determined by the set rotation speed Ss of the optical disc 100, and stores the readout data in the buffer memory 20A (which is the equivalent of a data storage section). At the same time, the optical disc device 1 reads out from the buffer memory 20A a piece of readout data corresponding to the request-specification information, and supplies the piece of readout data to the main electronics device 2 as request data, sets, when starts rotating the optical disc 100 from rest or the rotation stop state, the smallest estimated rotation speed Si1, which is smaller than the specified rotation speed Sd, as the set rotation speed Ss, and, each time it is determined that the buffer memory 20A is filled with a predetermined amount of readout data because the storing-data amount Da, an amount of readout data stored in the buffer memory 20A, has reached the storage data maximum amount $D_{MAX}$, sets the larger estimated rotation speed Si2 to Si4 as the set rotation speed Ss to gradually increase the set rotation speed Ss to the specified rotation speed Sd.

Since the optical disc device 1 sets the estimated rotation speed Si1 that can stabilize the set rotation speed Ss of the optical disc 100 faster than the other estimated rotation speeds, it can immediately start reading out data from the optical disc 100. This can decrease the readout downtime during which the readout process of readout data is being stopped. It also allows the optical disc device 1 to change the set rotation speed Ss after the storing-data amount Da becomes greater than or equal to a predetermined storage level, preventing the storing-data amount Da of the buffer memory 20A from becoming zero. Thus, the optical disc device 1 can smoothly supplies request data to the main electronics device 2.

Moreover, when the amount of readout data stored in the buffer memory 20A has reached a maximum it can store, or the storage data maximum amount $D_{MAX}$, the optical disc device 1 sets the larger estimated rotation speed Si2 to Si4 as the set rotation speed Ss. This prevents the storing-data amount Da of the buffer memory 20A from becoming zero during the readout downtime.

When it is switched from stop mode to reproduction mode or a difference piece of information recorded on the optical disc 100 is selected for reproduction, the optical disc device 1 has to search for the playback-target piece of information before starting reproduction: So a user may think it would take time to restart reproduction. However, temporarily-stop sub mode is designed to restart reproduction from where the reproduction stopped temporarily: So a user might think the reproduction would restart immediately after he/she inputs a playback restart command.

If a piece of read out data corresponding to the request-specification information is not stored in the buffer memory 20A, the optical disc device 1 sets the specified rotation speed Sd as the set rotation speed Ss to perform the high-speed reproduction process: The high-speed reproduction process, which takes a little time to start supplying, is performed not only when it is difficult to continue the gradual reproduction process because the speed at which readout data are stored is slower than the speed at which request data are supplied and therefore the storing-data amount Da of the buffer memory 20A would become zero, but also when it starts reproduction after entering reproduction mode or a different part of data is selected for reproduction.

At this time, the optical disc device 1 can reduce the number of determinations it has to make and thereby more easily control the process, compared to a case in which the device has to make determinations as to whether continuing the gradual reproduction process is difficult or not both when starting reproduction and when a different point of data is selected for reproduction.

That is, when it starts rotating the optical disc 100 from rest, the optical disc device 1 sets, from among a plurality of estimated rotation speeds Si, the estimated rotation speed Si that is smaller than the specified rotation speed Sd as the set rotation speed Sd in accordance with the specified rotation speed Sd specified by the main electronics device 2 as for the optical disc 100 on which request data are recorded, and rotates the optical disc 100. Moreover, the optical disc device 1 reads out, as request data, a piece of readout data corresponding to the request-specification information from the buffer memory 20A that has already stored the readout data read out from the optical disc 100 in accordance with the request-specification information that specifies a piece of request data requested by the main electronics device 2, and then starts supplying it to the main electronics device 2. When the current rotation speed Sn of the optical disc 100 becomes the set rotation speed Ss, the optical disc device 1 reads out the readout data from the optical disc 100 at the readout speed determined by the set rotation speed Ss, and stores them in the buffer memory 20A. If the set rotation speed Ss is not the specified rotation speed Sd, the optical disc device 1 makes a determination as to whether the storing-data amount Da, an amount of readout data stored in the buffer memory 20A, is greater than or equal to a predetermined amount or not. Each time the optical disc device 1 determines that the amount of data stored in the buffer memory 20A is greater than or equal to the predetermined amount, the optical disc device 1 sets the larger estimated rotation speed Si as the set rotation speed Ss to gradually increase the set rotation speed Ss to the specified rotation speed Sd.

According to the above configuration, the optical disc device 1 reads out readout data from the optical disc 100 at the readout speed determined by the specified rotation speed Sd supplied from the main electronics device 2, temporarily stores the readout data in the buffer memory 20A, reads out from the buffer memory 20A a piece of request data corresponding to the request-specification information supplied from the main electronics device 2, supplies it to the main electronics device 2, and, if the request-specification information is supplied when the rotation of the optical disc 100 is stopped, reads out a piece of request data from the buffer memory 20A and supplies it. At the same time, the optical disc device 1 rotates the optical disc 100 at the speed of the smallest estimated rotation speed Si1 and reads out information. When the storing-data amount Da of the buffer memory 20A becomes greater than or equal to the predetermined amount, the optical disc device 1 sets the next estimated rotation speed Si1 to Si4. Accordingly, an information reproduction device, a reproduction starting method and a reproduction starting program can supply request data to the main electronics device 2 smoothly and immediately.

(6) Other Embodiments

In the above-noted embodiment, when the storing-data amount Da becomes the storage data maximum amount $D_{MAX}$, the device sets the next estimated rotation speed Si1 to Si4 as the set rotation speed Ss. However the present invention is not limited to this. The device may set the next estimated rotation speed Si1 to Si4 as the set rotation speed Ss when the storing-data amount Da of the buffer memory 20A becomes greater than or equal to a predetermined amount.

In this case, the predetermined amounts may be determined by the next estimated rotation speed Si. For example, if the estimated rotation speeds Si1, Si2, Si3 and Si4 are not a series with a constant ratio between successive ones (if they are not one, two, four and eight times faster than normal, respectively), the readout process of readout data from the optical disc 100 may be suspended during a period of time that varies according to the difference between the currently set rotation speed Ss and the subsequently set one Si. Accordingly, the predetermined amount may be determined by the difference. Accordingly, the device can increase the set rotation speed Ss to the specified rotation speed Sd for a short period of time.

Moreover, in the above-noted embodiment, the gradual reproduction process sets the smallest estimated rotation speed Si1 as the set rotation speed Ss. However the present invention is not limited to this. It may be able to set other estimated rotation speed, such as the estimated rotation speed Si2 or Si3, as long as they are smaller than the specified rotation speed Sd. This means that, if the optical disc device 1 sets the estimated rotation speed Si that is larger (faster) than the speed at which data are supplied, it can keep the storing-data amount Da of the buffer memory 20A greater than or equal to the predetermined amount, and thereby can offer the same effect as the above-noted embodiment. At this time, from among the estimated rotation speeds Si that are larger than the speed at which data are supplied, the optical disc device 1 may select, in accordance with the speed at which request data are supplied, the smallest estimated rotation speed Si and set it as the set rotation speed Ss.

Similarly, the larger estimated rotation speeds Si are sequentially selected for the set rotation speed Ss. However the present invention is not limited to this. As long as what it selects is larger (faster) than the previous one, the set rotation speed Ss may be switched from the estimated rotation speed Si1 to the estimated rotation speed Si3.

Furthermore, in the above-noted embodiment, the maximum drive voltage is applied during a period of time (an applying time) that varies according to the difference between the currently set rotation speed and the subsequently set rotation speed. However the present invention is not limited to this. For example, a different value of drive voltage may be sequentially applied for a predetermined period of time. There is no restriction on how to apply a drive voltage when increasing the rotation.

In addition, the maximum drive voltage is not necessarily applied: A predetermined drive voltage that is bigger than the stable drive voltage Va may be applied. This could offer the same effect as the above-noted embodiment.

Furthermore, in the above-noted embodiment, the gradual reproduction process is only performed when restarting reproduction. However the present invention is not limited to this. The gradual reproduction process may also be performed when starting reproduction after the main electronics device 2 is switched from stop mode to reproduction mode. This could offer the same effect as the above-noted embodiment.

Furthermore, in the above-noted embodiment, if a piece of readout data corresponding to the request-specification information are not stored in the buffer memory 20A, the device sets the specified rotation speed Sd as the set rotation speed Ss and performs the high-speed reproduction process when starting reproduction. On the other hand, when restarting reproduction from where it temporarily stopped, the device performs the gradual reproduction process. And if it is difficult to perform the gradual reproduction process, the device instead performs the high-speed reproduction process. However the present invention is not limited to this. For example, based on whether it has received the information-supplying command or not, the device may make a determination as to whether it is about to start reproduction or restart reproduction from where it temporarily stopped. If it is about to start reproduction, the device may start the high-speed reproduction process. Whereas if it is about to restart reproduction, the device may start the gradual reproduction process: During the rotation stop state of the gradual reproduction process, based on the speed at which the storing-data amount Da decreases and the speed at which the request-specification information is supplied, the device may make a determination as to whether it should start the gradual reproduction process, and, if the negative result is obtained, the device instead may start the high-speed reproduction process.

That could offer the same effect as the above-noted embodiment. In addition, that can reduce the time it takes to start reading out readout data from the optical disc 100, because the device immediately finds it difficult to perform the gradual reproduction process and instead starts the high-speed reproduction process.

Similarly, the optical disc device 1 may make a determination as to whether the addresses of the request data specified by the request-specification information are contiguous, and, if they are not contiguous, then perform the high-speed reproduction process and make a determination as to whether a different point of data to be reproduced is selected.

Furthermore, in the above-noted embodiment, if the request-specification information is not supplied during a predetermined period of reproduction waiting time, the device performs the rotation stop process. However the present invention is not limited to this. For example, when a predetermined period of reproduction waiting time has elapsed after a user inputs a temporarily stopping request, the main electronics device 2 may supply a temporarily stopping command to the optical disc device 1, which then performs the rotation stop process. This could offer the same effect as the above-noted embodiment.

Furthermore, in the above-noted embodiment, the specified rotation speed Sd is supplied along with the information-supplying command when starting reproduction. The specified rotation speed Sd, which is supplied when starting reproduction, is finally set as the set rotation speed Ss when restarting reproduction from where it temporarily stopped. However the present invention is not limited to this. The specified rotation speed Sd may be supplied again from the main electronics device 2 when restarting reproduction from where it temporarily stopped, and it may be finally set as the set rotation speed Ss. This could offer the same effect as the above-noted embodiment.

Furthermore, in the above-noted embodiment, the rotation stop process is performed to stop the rotation of the optical disc 100 after the amount of data stored in the buffer memory 20A reaches a maximum the memory 20A can store. However the present invention is not limited to this. The rotation of the optical disc 100 may be stopped after the amount of data stored in the buffer memory 20A reaches a certain level that is determined by the smallest estimated rotation speed Si1, or the rotation stop process may be not performed at all. This could offer the same effect as the above-noted embodiment.

Furthermore, in the above-noted embodiment, after the buffer memory 20A achieves the storage data maximum amount $D_{MAX}$, the device stops emitting an optical beam and reading out readout data from the optical disc 100. When the storing-data amount Da of the buffer memory 20A becomes less than the predetermined remaining threshold Db, the device starts emitting an optical beam and reading out readout data from the optical disc 100. However the present invention is not limited to this. The device may not stop emitting the optical beam. This could offer the same effect as the above-noted embodiment.

Furthermore, in the above-noted embodiment, when the main electronics device 2 is running in reproduction mode, the rotation control process is performed based on the rotation control program. However the present invention is not limited to this. For example, when starting or restarting reproduction, the above-described gradual reproduction process may be performed based on a reproduction starting program. This could offer the same effect as the above-noted embodiment.

Furthermore, in the above-noted embodiment, the optical disc 1 is installed in the main electronics device 2. However the present invention is not limited to this. For example, the independent optical disc device may be connected to an external device, such as the main electronics device 2 and a personal computer. The optical disc device 1 is not necessarily connected to the main electronics device 2 directly: The optical disc device 1 may be connected to the main electronics device 2 via other electronics devices or a network.

Furthermore, in the above-noted embodiment, the gradual reproduction process is applied to the optical disc 100, a disc-shaped information recording medium. However the present invention is not limited to this. The gradual reproduction process may be applied to a disc-shaped magnetic recording medium.

Furthermore, in the above-noted embodiment, from among the readout data stored in the buffer memory 20A, a piece of request data is retrieved and supplied to the main electronics device 2. However the present invention is not limited to this. If the speed at which data are read out from the optical disc 100 is the same as the speed at which request data are supplied, a piece of readout data is read out immediately after being stored and then it is supplied as a piece of request data.

Furthermore, in the above-noted embodiment, the above method is applied to the optical disc device 1 that can record and reproduce data. However the present invention is not limited to this. The above method can also applied to various types of information reproduction devices that can only reproduce data. This could also offer the same effect as the above-noted embodiment.

Furthermore, in the above-noted embodiment, the rotation control program and other programs are previously stored in the flash memory 11. However the present invention is not limited to this. The programs can also be installed in the flash memory 11 from an external storage medium, such as "MEMORY STICK (Registered Trademark of Sony Corporation)." The programs may be acquired from the outside via Universal Serial Bus, "ETHERNET (Registered Trademark)," and a wireless Local Area Network such as Institute of Electrical and Electronics Engineers 802.11a/b/g. The programs may be provided through the terrestrial digital broadcasting, BS digital broadcasting and the like.

Furthermore, in the above-noted embodiment, the optical disc device 1, which is the equivalent of an information reproduction device, includes: the external interface 12, which is the equivalent of a receiving section; the drive control section 13 and the rotation control section 10C, which are the equivalent of a disc rotation section; the OP control section 11A and the optical pickup 16, which are the equivalent of a data reading section; the microcomputer 10, which is the equivalent of a data amount determination section; and the buffer memory 20A and the memory control section 10B, which are the equivalent of a data storage section. However the present invention is not limited to this. An information reproduction device of an embodiment of the present invention may include a disc rotation section, a data reading section and a data storage section.

The information reproduction device, reproduction starting method and reproduction starting program of an embodiment of the present invention can be applied to an optical disc device that is installed in various types of electronics devices, for example.

It should be understood by those skilled in the art that various modifications, combinations, sub-combinations and alterations may occur depending on design requirements and other factors insofar as they are within the scope of the appended claims or the equivalents thereof.

What is claimed is:

1. An information reproduction device comprising:
   a receiving section that receives request-specification information specifying a piece of data requested by an external device and a specified rotation speed specifying a rotation speed of a disc-shaped storage medium storing data;
   a disc rotation section that selects, from among a plurality of estimated rotation speeds, a set rotation speed based on the specified rotation speed and rotates the storage medium at the set rotation speed;
   a data reading section that reads out data from the storage medium at a readout speed that is determined by the set rotation speed of the storage medium;
   a data storage section that stores the data read out from the storage medium and supplies, from among the stored data, the piece of data corresponding to the request-specification information to the external device; and
   a data amount determination section that makes a determination as to whether the amount of data stored in the data storage section is greater than or equal to a predetermined amount, wherein
   the disc rotation section selects, when starting the rotation of the storage medium from rest, an estimated rotation speed of the plurality of estimated rotation speeds that is smaller than the specified rotation speed as the set rotation speed, and, each time the data amount determination section determines that the amount of data stored in the data storage section is greater than or equal to the predetermined amount, sets a larger estimated rotation speed as the set rotation speed to incrementally increase the set rotation speed to the specified rotation speed, and
   wherein when the data storage section stores a maximum amount of data, an optical beam emitted by the data reading section is stopped for a specified time, the disc-shaped storage medium continues to rotate at the set rotation speed, and the optical beam is restarted such that data readout, by the data reading section, is immediately restarted in accordance with the set rotation speed upon receipt of additional request-specific information.

2. The information reproduction device according to claim 1, wherein
   the predetermined amount is the maximum amount.

3. The information reproduction device according to claim 1, wherein
   the disc rotation section applies a predetermined drive voltage during an applying time that varies according to the difference between the currently set rotation speed and the subsequently set rotation speed to rotate the storage medium at the set rotation speed.

4. The information reproduction device according to claim 1, wherein
   when the rotation of the storage medium is not stopped temporarily, the disc rotation section sets the specified rotation speed as the set rotation speed.

5. The information reproduction device according to claim 1, wherein
   when the readout speed that varies according to the set rotation speed is slower than the speed at which the data are supplied to the external device, the disc rotation section sets the specified rotation speed as the set rotation speed.

6. The information reproduction device according to claim 1, wherein when the piece of data specified by the request-specification information is not contiguous, the disc rotation section sets the specified rotation speed as the set rotation speed.

7. The information reproduction device according to claim 1, wherein when the piece of data corresponding to the request-specification information is not stored in the data storage section, the disc rotation section sets the specified rotation speed as the set rotation speed.

8. The information reproduction device according to claim 1, wherein when a predetermined period of reproduction waiting time has elapsed after the supply of the request-specification information is stopped, the disc rotation section stops the rotation of the storage medium after the data storage section is filled with the maximum amount of data.

9. The information reproduction device according to claim 1, wherein the data reading section stops, when the data storage section is filled with the maximum amount of data, reading data from the storage medium, and, when the amount of data stored in the data storage section becomes less than a predetermined remaining threshold, starts reading data from the storage medium again.

10. A reproduction starting method of an information reproduction device that sets, from among a plurality of estimated rotation speeds previously estimated, a set rotation speed in accordance with request-specification information specifying a piece of data requested by an external device and a specified rotation speed specified by the external device for a disc-shaped storage medium storing data, rotates the storage medium at the set rotation speed, reads out data from the storage medium at a readout speed that is determined by the set rotation speed of the storage medium, stores the data in a data storage section, and supplies, from among the stored data, the piece of data corresponding to the request-specification information to the external device, the reproduction starting method for starting the rotation of the storage medium from rest comprising:

a rotation speed setting step of setting the estimated rotation speed that is smaller than the specified rotation speed as the set rotation speed;

a data amount determination step of making a determination as to whether the amount of data stored in the data storage section is greater than or equal to a predetermined amount or not when the set rotation speed is not the specified rotation speed; and a rotation speed changing step of setting, each time it is determined that the amount of data stored in the data storage section is greater than or equal to the predetermined amount, a larger estimated rotation speed as the set rotation speed to incrementally increase the set rotation speed to the specified rotation speed, wherein when the data storage section stores a maximum amount of data, an optical beam emitted by the data reading section is stopped for a specified time, the disc-shaped storage medium continues to rotate at the set rotation speed, and the optical beam is restarted such that data readout, by the data reading section, is immediately restarted in accordance with the set rotation speed upon receipt of additional request-specific information.

11. A non-transitory computer-readable storage medium having computer readable program codes embodied in the computer readable storage medium that, when executed cause an information reproduction device to execute setting, based on a plurality of estimated rotation speeds previously estimated, a set rotation speed in accordance with request-specification information specifying a piece of data requested by an external device and a specified rotation speed specified by the external device for a disc-shaped storage medium storing data, rotates the storage medium at the set rotation speed, reads out data from the storage medium at a readout speed that is determined by the set rotation speed of the storage medium, stores the data in a data storage section, and supplies, from among the stored data, the piece of data corresponding to the request-specification information to the external device, and further causing the information reproduction device, when starting the rotation of the storage medium from rest, to execute:

a rotation speed setting step of setting the estimated rotation speed that is smaller than the specified rotation speed as the set rotation speed;

a data amount determination step of making a determination as to whether the amount of data stored in the data storage section is greater than or equal to a predetermined amount or not when the set rotation speed is not the specified rotation speed; and a rotation speed changing step of setting, each time it is determined that the amount of data stored in the data storage section is greater than or equal to the predetermined amount, a larger estimated rotation speed as the set rotation speed to incrementally increase the set rotation speed to the specified rotation speed wherein when the data storage section stores a maximum amount of data, an optical beam emitted by the data reading section is stopped for a specified time, the disc-shaped storage medium continues to rotate at the set rotation speed, and the optical beam is restarted such that data readout, by the data reading section, is immediately restarted in accordance with the set rotation speed upon receipt of additional request-specific information.

\* \* \* \* \*